(12) United States Patent
Meir et al.

(10) Patent No.: US 9,946,040 B2
(45) Date of Patent: Apr. 17, 2018

(54) OPTICAL FIBERS WITHOUT CLADDING

(71) Applicant: EMPIRE TECHNOLOGY DEVELOPMENT LLC, Wilmington, DE (US)

(72) Inventors: Noam Meir, Herzliya (IL); Mordehai Margalit, Zichron Yaaqov (IL)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 15/112,165

(22) PCT Filed: Jan. 17, 2014

(86) PCT No.: PCT/US2014/011987
§ 371 (c)(1),
(2) Date: Jul. 15, 2016

(87) PCT Pub. No.: WO2015/108529
PCT Pub. Date: Jul. 23, 2015

(65) Prior Publication Data
US 2016/0341916 A1    Nov. 24, 2016

(51) Int. Cl.
| | |
|---|---|
| G02B 6/42 | (2006.01) |
| G02B 6/40 | (2006.01) |
| G02B 6/14 | (2006.01) |
| G02B 6/02 | (2006.01) |
| G02B 6/245 | (2006.01) |

(Continued)

(52) U.S. Cl.
CPC ......... *G02B 6/425* (2013.01); *G02B 6/02052* (2013.01); *G02B 6/14* (2013.01); *G02B 6/245* (2013.01); *G02B 6/3885* (2013.01); *G02B 6/403* (2013.01); *G02B 6/4203* (2013.01);

(Continued)

(58) Field of Classification Search
CPC ...... G02B 6/425; G02B 6/02052; G02B 6/14; G02B 6/245; G02B 6/3885; G02B 6/403; G02B 6/4203; G02B 6/4249; G02B 6/06; G02B 6/30

See application file for complete search history.

(56) References Cited

U.S. PATENT DOCUMENTS

| | | | | |
|---|---|---|---|---|
| 2,992,587 A | * | 7/1961 | Hicks, Jr. ................. | G02B 6/06 362/554 |
| 3,240,106 A | * | 3/1966 | Hicks, Jr. ............. | G02B 6/0006 250/227.26 |

(Continued)

OTHER PUBLICATIONS

Heinrich, J., et al., "Butt-Coupling Efficiency of VCSEL's into Multimode Fibers," IEEE Photonics Technology Letters, vol. 9, No. 12, pp. 1555-1557 (Dec. 1997).

(Continued)

*Primary Examiner* — Peter Radkowski
(74) *Attorney, Agent, or Firm* — Maschoff Brennan

(57) ABSTRACT

In some examples, an optical fiber may include a clad portion and an exposed fiber core that extends from the clad portion. Multiple such optical fibers may be included in a fiber bundle having a condensed region of fiber cores spaced at a first center-to-center spacing and a non-condensed region of clad portions spaced at a second center-to-center spacing greater than the first center-to-center spacing. Such optical fibers may be formed with exposed fiber cores ab initio.

23 Claims, 11 Drawing Sheets

(51) Int. Cl.
*G02B 6/38* (2006.01)
*G02B 6/30* (2006.01)
*G02B 6/06* (2006.01)

(52) U.S. Cl.
CPC .............. *G02B 6/4249* (2013.01); *G02B 6/06* (2013.01); *G02B 6/30* (2013.01)

(56) References Cited

U.S. PATENT DOCUMENTS

| | | | | |
|---|---|---|---|---|
| 3,900,245 A * | 8/1975 | Dyott | G02B 6/262 | 385/125 |
| 3,995,935 A * | 12/1976 | McCartney | G02B 6/264 | 385/15 |
| 4,575,181 A * | 3/1986 | Ishikawa | A61B 1/00165 | 385/126 |
| 4,783,137 A * | 11/1988 | Kosman | H04B 10/502 | 250/227.24 |
| 4,795,228 A * | 1/1989 | Schneider | G02B 6/4206 | 385/126 |
| 4,815,816 A * | 3/1989 | Schneider | A61B 1/00096 | 250/227.2 |
| 4,815,817 A * | 3/1989 | Levinson | G02B 6/2826 | 385/128 |
| 4,863,236 A * | 9/1989 | Herbrechtsmeier | B05D 7/02 | 385/143 |
| 4,868,361 A * | 9/1989 | Chande | G02B 6/32 | 219/121.62 |
| 4,877,300 A * | 10/1989 | Newhouse | G02B 6/4202 | 385/43 |
| 5,018,823 A * | 5/1991 | Himmelwright | G02B 6/3813 | 385/70 |
| 5,044,723 A * | 9/1991 | MacDonald | G01F 23/2925 | 356/128 |
| 5,054,877 A * | 10/1991 | Ortiz, Jr. | G02B 6/2817 | 385/33 |
| 5,179,610 A * | 1/1993 | Milburn | G02B 6/3813 | 385/147 |
| 5,185,836 A * | 2/1993 | Baker | G02B 6/262 | 385/33 |
| 5,210,815 A * | 5/1993 | Alexander | G02B 6/262 | 385/138 |
| 5,241,613 A * | 8/1993 | Li | G02B 6/02 | 385/29 |
| 5,291,570 A * | 3/1994 | Filgas | G02B 6/3813 | 385/78 |
| 5,315,680 A * | 5/1994 | Musk | G02B 6/4292 | 385/29 |
| 5,490,227 A * | 2/1996 | Tanabe | G02B 6/02 | 385/28 |
| 5,738,677 A * | 4/1998 | Colvard | A61B 9/00802 | 128/898 |
| 5,796,909 A * | 8/1998 | Islam | B82Y 20/00 | 385/147 |
| 6,123,442 A * | 9/2000 | Freier | G02B 6/001 | 362/559 |
| 6,151,429 A * | 11/2000 | Kristensen | G02B 6/02109 | 385/11 |
| 6,243,520 B1 * | 6/2001 | Goldman | G02B 6/06 | 385/115 |
| 6,275,628 B1 * | 8/2001 | Jones | G02B 6/02057 | 385/29 |
| 6,330,382 B1 * | 12/2001 | Harshbarger | G02B 6/14 | 385/123 |
| 6,408,126 B1 * | 6/2002 | Hoekstra | G02B 6/125 | 385/130 |
| 6,428,217 B1 * | 8/2002 | Giltner | G02B 6/2551 | 372/6 |
| 6,434,302 B1 * | 8/2002 | Fidric | G02B 6/2856 | 385/43 |
| 6,445,858 B1 * | 9/2002 | Musk | G02B 6/4226 | 385/52 |
| 6,487,349 B2 * | 11/2002 | Wach | A61B 5/14546 | 385/115 |
| 6,694,073 B2 * | 2/2004 | Golub | G02B 6/266 | 385/18 |
| 6,810,185 B2 * | 10/2004 | Qi | G02B 6/02261 | 385/127 |
| 6,888,991 B2 * | 5/2005 | White | G02B 6/02252 | 385/123 |
| 6,904,198 B2 * | 6/2005 | Dykaar | G02B 6/02085 | 385/124 |
| 6,905,627 B2 * | 6/2005 | Wei | G02B 6/262 | 156/345.11 |
| 6,947,635 B2 * | 9/2005 | Kohns | G02B 6/4204 | 385/28 |
| 6,948,862 B2 * | 9/2005 | Brown | G02B 6/3813 | 385/78 |
| 6,999,481 B1 * | 2/2006 | Jurgensen | H01S 3/06708 | 372/20 |
| 7,010,204 B2 * | 3/2006 | Reith | G02B 6/03627 | 385/128 |
| 7,106,928 B2 * | 9/2006 | Dykaar | G02B 6/02085 | 385/124 |
| 7,194,016 B2 * | 3/2007 | Bullington | G02B 6/34 | 372/108 |
| 7,267,494 B2 * | 9/2007 | Deng | G02B 6/421 | 385/27 |
| 7,296,939 B2 * | 11/2007 | Sonoda | G02B 6/4248 | 385/88 |
| 7,306,376 B2 * | 12/2007 | Scerbak | G02B 6/4296 | 385/76 |
| 7,349,596 B2 * | 3/2008 | Anderegg | G02B 6/26 | 385/27 |
| 7,406,238 B2 * | 7/2008 | Hokansson | G02B 6/0288 | 385/123 |
| 7,551,823 B2 * | 6/2009 | Reith | G02B 6/03627 | 385/123 |
| 7,580,600 B1 * | 8/2009 | Starodubov | G02B 6/4296 | 385/124 |
| 7,953,308 B2 * | 5/2011 | Fomitchov | G02B 6/06 | 385/116 |
| 8,027,555 B1 * | 9/2011 | Kliner | G02B 6/2852 | 385/29 |
| 8,218,928 B2 * | 7/2012 | Jasapara | G02B 6/0288 | 359/341.1 |
| 8,282,291 B2 * | 10/2012 | Zheng | G02B 6/2555 | 385/95 |
| 8,433,161 B2 * | 4/2013 | Langseth | G02B 6/14 | 385/15 |
| 8,542,971 B2 * | 9/2013 | Chatigny | H01S 3/06704 | 385/134 |
| 8,811,789 B2 * | 8/2014 | Reith | G02B 6/03627 | 385/126 |
| 8,876,811 B2 * | 11/2014 | Lewinsky | A61B 18/22 | 606/16 |
| 8,909,017 B2 * | 12/2014 | Jasapara | G02B 6/0288 | 359/341.1 |
| 9,116,296 B2 * | 8/2015 | Fisher | B32B 37/12 | |
| 9,318,876 B1 * | 4/2016 | Li | H01S 5/4012 | |
| 9,453,967 B2 * | 9/2016 | Duesterberg | G02B 6/262 | |
| 2002/0041741 A1 * | 4/2002 | Ciemiewicz | G02B 6/06 | 385/89 |
| 2002/0172468 A1 * | 11/2002 | Naghski | G02B 6/3869 | 385/54 |
| 2003/0068138 A1 * | 4/2003 | Jack | G02B 6/3833 | 385/80 |
| 2003/0142940 A1 * | 7/2003 | Qi | G02B 6/02261 | 385/127 |
| 2004/0020896 A1 * | 2/2004 | Dasgupta | G02B 6/305 | 216/24 |
| 2004/0042718 A1 * | 3/2004 | Kohns | G02B 6/4204 | 385/32 |
| 2004/0071409 A1 * | 4/2004 | Brown | G02B 6/3813 | 385/78 |
| 2004/0165637 A1 * | 8/2004 | Bullington | G02B 6/34 | 372/50.11 |

(56) References Cited

U.S. PATENT DOCUMENTS

| | | | | |
|---|---|---|---|---|
| 2004/0175074 A1* | 9/2004 | Dykaar | G02B 6/02085 | 385/37 |
| 2004/0175086 A1* | 9/2004 | Reith | G02B 6/03627 | 385/128 |
| 2004/0197060 A1* | 10/2004 | White | G02B 6/02252 | 385/123 |
| 2005/0058411 A1* | 3/2005 | Finot | G02B 6/4201 | 385/94 |
| 2005/0220403 A1* | 10/2005 | Dykaar | G02B 6/02085 | 385/31 |
| 2005/0259918 A1* | 11/2005 | Coleman | G02B 6/4206 | 385/33 |
| 2006/0018609 A1* | 1/2006 | Sonoda | G02B 6/4248 | 385/93 |
| 2006/0062532 A1* | 3/2006 | Reith | G02B 6/03627 | 385/123 |
| 2006/0171631 A1* | 8/2006 | Deng | G02B 6/421 | 385/28 |
| 2007/0172174 A1* | 7/2007 | Scerbak | G02B 6/4296 | 385/76 |
| 2007/0217738 A1* | 9/2007 | Anderegg | G02B 6/26 | 385/29 |
| 2007/0292087 A1* | 12/2007 | Brown | G02B 6/3813 | 385/92 |
| 2008/0019650 A1* | 1/2008 | Hokansson | G02B 6/0288 | 385/128 |
| 2008/0305255 A1* | 12/2008 | Beauvais | G02B 6/08 | 427/163.2 |
| 2009/0052857 A1* | 2/2009 | Skidmore | G02B 6/4238 | 385/137 |
| 2009/0080835 A1* | 3/2009 | Frith | G02B 6/14 | 385/50 |
| 2009/0238526 A1* | 9/2009 | Reith | G02B 6/03627 | 385/128 |
| 2010/0098377 A1* | 4/2010 | Meir | G02B 6/0015 | 385/28 |
| 2010/0271689 A1* | 10/2010 | Jasapara | G02B 6/0288 | 359/341.1 |
| 2011/0087202 A1* | 4/2011 | Lewinsky | A61B 18/22 | 606/14 |
| 2011/0205252 A1* | 8/2011 | Handa | G09G 3/3291 | 345/690 |
| 2011/0226019 A1* | 9/2011 | Huang | G02B 6/2551 | 65/407 |
| 2012/0014639 A1* | 1/2012 | Doany | G02B 6/02042 | 385/14 |
| 2012/0070115 A1* | 3/2012 | Langseth | G02B 6/14 | 385/29 |
| 2012/0237164 A1* | 9/2012 | Jasapara | H04B 10/2581 | 385/33 |
| 2012/0316549 A1* | 12/2012 | Lewinsky | A61B 18/22 | 606/16 |
| 2013/0177283 A1* | 7/2013 | Theuerkorn | G02B 6/4429 | 385/113 |
| 2014/0211818 A1* | 7/2014 | Hou | H01S 3/094007 | 372/6 |
| 2014/0241385 A1* | 8/2014 | Fomin | G02B 6/4296 | 372/6 |
| 2014/0363125 A1* | 12/2014 | Schwarzenbach | G02B 6/14 | 385/29 |
| 2015/0049983 A1* | 2/2015 | Fisher | B32B 37/12 | 385/29 |
| 2015/0057649 A1* | 2/2015 | Lewinsky | A61B 18/22 | 606/18 |
| 2016/0109656 A1* | 4/2016 | Duesterberg | G02B 6/262 | 385/29 |
| 2016/0202419 A1* | 7/2016 | Lapointe | G02B 6/2852 | 385/29 |
| 2016/0313513 A1* | 10/2016 | Wijbrans | G02B 6/32 | |
| 2016/0320571 A1* | 11/2016 | Wijbrans | G02B 6/3855 | |
| 2016/0341906 A1* | 11/2016 | Rinzler | G02B 6/3813 | |

OTHER PUBLICATIONS

Hwang, S.H., et al., "120 Gb/s-level VCSEL Array Optical Subassembly using Passive Alignment Technique," 58th Electronic Components and Technology Conference, pp. 1620-1624 (May 27-30, 2008).

International Search Report with Written Opinion for International Application No. PCT/US2014/011987 dated Jul. 9, 2014.

Kosaka, H., et al., "Plastic-Based Receptacle-Type VCSEL-Array Modules with One and Two Dimensions Fabricated Using the Self-Alignment Mounting Technique," 47th Electronic Components and Technology Conference, pp. 382-390 (May 18-21, 1997).

Pugmire, G.T., et al., "Controllable cladding removal for in-fiber integrated optics applications," Optoelectronic Devices and Applications, vol. 1338, pp. 2-10 (Nov. 1, 1990).

Tatum, J., et al., "High Speed Characteristics of VCSELs," Proceedings of the SPIE, vol. 3004, pp. 151-159 (May 1, 1997).

"28 Gbit/s VCSEL and VCSEL Array," VI Systems GmbH, No. 100206-Rev 1.9, pp. 4 (Jan. 2011).

"Cladding mode," Wikipedia, accessed at http://web.archive.org/web/20151207175145/https://en.wikipedia.org/wiki/Cladding_mode, last modified on Oct. 9, 2014, p. 1.

"Concentricity Error," accessed at http://web.archive.org/web/20121231083453/http://www.timbercon.com/Concentricity-Error.html, accessed on Jun. 29, 2016, pp. 2.

"Fiber Cable Construction," Olabs Technologies Company Limited, pp. 1-4 (2013).

"Fiber Optical Networks Revealed," Industrial Strength Networks, pp. 1-15, RuggedCom Inc. (2003).

"Fiber Optics," Chapter 4, accessed at http://web.archive.org/web/20130310085623/http://ptuas.loremate.com/phy/node/4, accessed on Jun. 29, 2016, pp. 6.

"Fiber-Optic Technology," The International Engineering Consortium, CORNING, accessed at http://www.dsif.fee.unicamp.br/~moschim/cursos/ie007/fibraoptica.pdf, accessed on Jun. 29, 2016, pp. 1-23.

"Legacy Graded-Index Multimode Optical Fibre 62.5/125 μm (1300nm bandwidth optimized)," Draka, Prysmian Group, accessed at http://it.prysmiangroup.com/it/business_markets/markets/renewable/downloads/datasheets/Fibra-multimodale-OM1_OM2_625.pdf, accessed on Jun. 29, 2016, pp. 2.

"Numerical aperture," Wikipedia, accessed at http://web.archive.org/web/20151106170733/https://en.wikipedia.org/wiki/Numerical_aperture, last modified on May 16, 2015, pp. 6.

"Products & Services: Optical Comms & Data: Optical Radiation & Photonics : Science + Technology : National Physica Laboratory," accessed at https://web.archive.org/web/20131010070406/http://www.npl.co.uk/optical-radiation-photonics/optical-comms-and-data/products-and-services/, accessed on Jun. 29, 2016, p. 1.

"What is Cladding Mode, Mode Stripping, and Leaky Mode?," accessed at http://web.archive.org/web/20130525011521/http://www.fiberoptics4sale.com/wordpress/what-is-cladding-mode-mode-stripping-and-leaky-mode, Mar. 1, 2012, pp. 6.

"Explaining Fiber Propagation Modes" Olabs Technologies Company Limited, pp. 1-4 (2013).

* cited by examiner

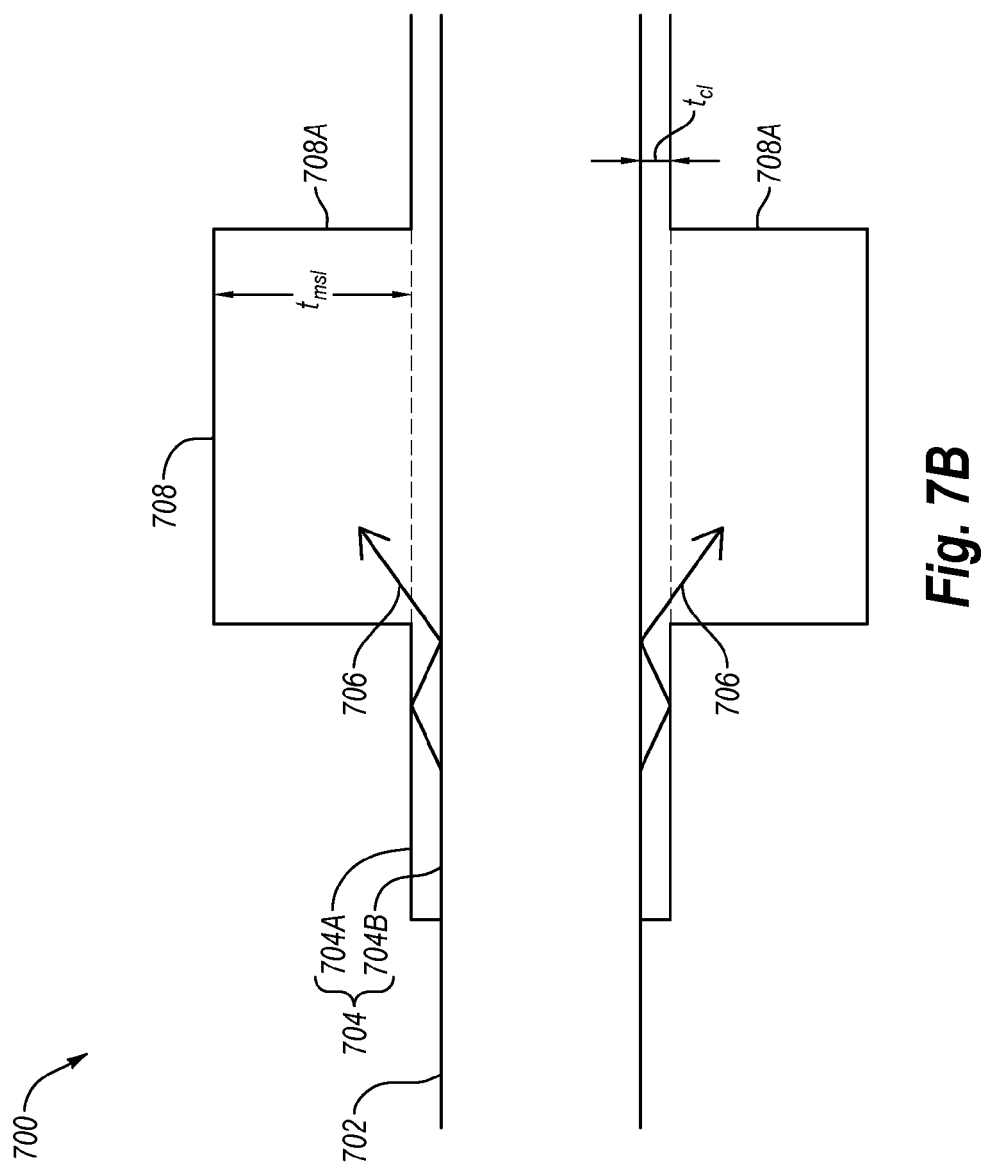

OPTICAL FIBERS WITHOUT CLADDING

CROSS-REFERENCE TO RELATED APPLICATION

This application is a U.S. National Stage filing under 35 U.S.C. § 371 of International Application No. PCT/US2014/011987, filed on Jan. 17, 2014.

BACKGROUND

Unless otherwise indicated herein, the materials described herein are not prior art to the claims in the present application and are not admitted to be prior art by inclusion in this section.

Many applications for transducers, such as vertical cavity surface-emitting lasers (VCSELs) and photodiodes, include arrays of transducers formed on a common substrate, each of the transducers optically aligned with a corresponding one of multiple optical fibers in a fiber bundle. Improved technologies for aligning optical fibers to e.g. transducer arrays would be very valuable.

SUMMARY

Technologies described herein relate, for example, to optical fibers without cladding on at least one end of the optical fibers.

In some examples, a fiber bundle may include a first optical fiber, one or more second optical fibers, a condensed region, and a non-condensed region. The first optical fiber may have a first clad portion and a first exposed fiber core that extends from the first clad portion. The one or more second optical fibers may each have a second clad portion and a second exposed fiber core that extends from the second clad portion. Each second clad portion may be arranged substantially parallel to the first clad portion. In the condensed region, a first distal end of the first exposed fiber core may be arranged substantially parallel to a second distal end of each second exposed fiber core. Adjacent distal ends in the condensed region may have a first center-to-center spacing. The non-condensed region may include the first clad portion and the one or more second clad portions. Adjacent clad portions in the non-condensed region may have a second center-to-center spacing that is greater than the first center-to-center spacing.

In some examples, a method of forming an optical fiber may include forming an exposed fiber core. The method may also include forming an unexposed fiber core after forming the exposed fiber core. The unexposed fiber core may be formed continuous with the exposed fiber core. The method may also include forming a cladding layer surrounding the unexposed fiber core. The cladding layer and the unexposed fiber core may form a clad portion from which the exposed fiber core extends.

In some examples, a method of mechanically coupling two optical fibers may include positioning a first distal end of a first exposed fiber core of a first optical fiber in contact with a second distal end of a second exposed fiber core of a second optical fiber. The method may also include fusing the first distal end with the second distal end.

In some examples, a fiber bundle includes a first optical fiber and second optical fibers. The first optical fiber may have a first clad portion and a first exposed fiber core that extends from the first clad portion. The first exposed fiber core may have a first distal end. The second optical fibers may be arranged around the first optical fiber. Each second optical fiber may have a second clad portion and a second exposed fiber core that extends from the second clad portion. Each of the second exposed fiber cores may have a corresponding second exposed fiber core length. Each second exposed fiber core may include a bend region in which the corresponding second exposed fiber core is displaced by a corresponding displacement distance towards the first exposed fiber core. The fiber bundle may include second optical fibers having different displacement distances. For each second optical fiber, the corresponding second exposed fiber core length may be correlated with the displacement distance.

In some examples, a method of producing an optical fiber using a double crucible is described. The double crucible may have a first crucible chamber and a second crucible chamber surrounding the first crucible chamber. The first crucible chamber may have a first output. The second crucible chamber may have a second output. The method may include core feeding a core feed material into the first crucible chamber. The method may also include cladding feeding a cladding feed material into the second crucible chamber. The method may also include time modulating the cladding feeding to produce the optical fiber. The optical fiber may have a core including the core feed material. The optical fiber may have a cladding comprising the cladding feed material. The optical fiber may have a spatially-modulated cladding structure arising from time modulating the cladding feeding.

In some examples an optical assembly includes multiple transducers and a fiber bundle. The multiple transducers may have a transducer spacing between a first transducer and a second transducer of the multiple transducers. The fiber bundle may include a first optical fiber that has a first clad portion and a first exposed fiber core that extends from the first clad portion, and a second optical fiber that has a second clad portion and a second exposed fiber core that extends from the second clad portion. The second clad portion may be substantially parallel to the first clad portion. The fiber bundle may also include a condensed region in which a first distal end of the first exposed fiber core is arranged substantially parallel to a second distal end of the second exposed fiber core. The first distal end and the second distal end may have a first center-to-center spacing. The fiber bundle may also include a non-condensed region that includes the first clad portion and the second clad portion. The first clad portion and the second clad portion in the non-condensed region may have a second center-to-center spacing. The second center-to-center spacing may be greater than the first center-to-center spacing. The first center-to-center spacing may be approximately equal to the transducer spacing. The second center-to-center spacing may be greater than the transducer spacing.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

In the drawings:

FIG. 7B illustrates an embodiment of the optical fiber of FIG. 7A including a mode stripper layer;

DETAILED DESCRIPTION

Figure 1:
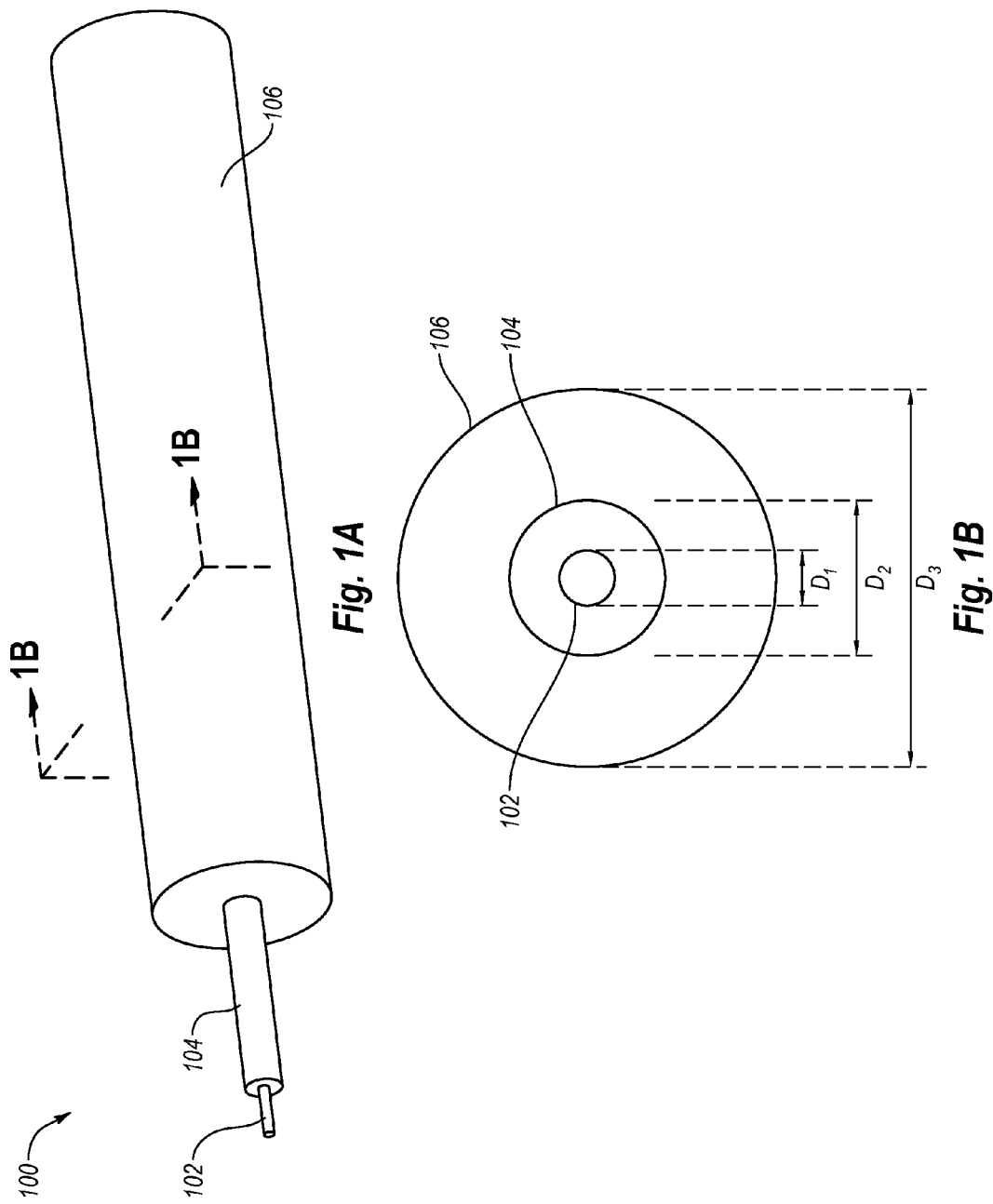
FIGS. 1A-1B illustrate an example optical fiber.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The minimum acceptable center-to-center spacing, or transducer pitch, for transducers in an array that are optically aligned with optical fibers in a fiber bundle may appear to be determined by the diameter of the optical fibers. For example, if the optical fibers each have a diameter of about 250 micrometers (μm) and the array of transducers is a linear array, the transducer pitch may appear to be limited to not less than about 250 μm to allow each transducer to be optically aligned with a corresponding one of the optical fibers. Accordingly, even though at least some transducers may have a diameter that is less than the diameter of the optical fibers such that an array of transducers with a transducer pitch that is less than the diameter of the optical fibers is possible, it may appear difficult to optically align the transducers of such an array with optical fibers having a diameter greater than the transducer pitch.

Technologies described herein relate, for example, to optical fibers without cladding on at least one end portion of appreciable length of the optical fibers, such that each optical fiber has an exposed fiber core that extends from a clad portion of the optical fiber. The absence of a cladding layer and a jacket of the optical fiber from the exposed fiber core may allow the exposed fiber core of one optical fiber to be positioned much closer to the exposed fiber core of another optical fiber than would otherwise be possible if both exposed fiber cores are surrounded by a cladding layer and a jacket.

Two or more optical fibers with exposed fiber cores extending from corresponding clad portions may be included in a fiber bundle having a condensed region of distal ends of exposed fiber cores and a non-condensed region of clad portions. The distal ends of the exposed fiber cores in the condensed region may be spaced at a first center-to-center spacing and the clad portions in the non-condensed region may be spaced at a second center-to-center spacing greater than the first center-to-center spacing. The first center-to-center spacing may be less than a diameter of the clad portions and as little as a core diameter of the exposed fiber cores. The second center-to-center spacing may be as little as the diameter of the clad portions, which diameter may include a cladding layer diameter or a jacket diameter of the optical fibers. The distal ends of the exposed fiber cores in the condensed region may be substantially parallel to each other and the clad portions in the non-condensed region may be substantially parallel to each other.

The optical fibers may include a first optical fiber including a first exposed fiber core extending from a first clad portion and one or more second optical fibers each including a second exposed fiber core extending from a second clad portion. The second optical fibers may extend to one or both sides of the first optical fiber, may surround the first optical fiber, or may be otherwise arranged relative to the first optical fiber. A length of the second exposed fiber cores may depend on a lateral displacement between a center of each corresponding second clad portion and a center of each corresponding second distal end.

Each exposed fiber core may include a mode stripper layer surrounding at least a portion of the exposed fiber core to suppress cladding-guided modes of light in the corresponding clad portion. Alternately or additionally, each exposed fiber core may include a mode-conversion reflector surrounding at least a portion of the exposed fiber core to convert higher order modes of light to lower order modes of light that will not be cladding-guided modes in the corresponding clad portion.

The optical fibers may be formed with exposed fiber cores ab initio. For example, a double crucible may be used to form optical fibers with exposed fiber cores ab initio by, for each optical fiber, forming an exposed fiber core; forming an unexposed fiber core after forming the exposed fiber core, where the unexposed fiber core is formed continuous with the exposed fiber core; and forming a cladding layer surrounding the unexposed fiber core. The cladding layer and the unexposed fiber core may form a clad portion from which the exposed fiber core extends. Two optical fibers with exposed fiber cores may be mechanically coupled end to end. For example, a first distal end of a first exposed fiber core of a first optical fiber may be positioned in contact with a second distal end of a second exposed fiber core of a second optical fiber. The first distal end may be fused with the second distal end. The fusing of the first distal end and the second distal end may form a fused region. A mode-conversion reflector may be formed at least partially surrounding the fused region to enhance light transmission efficiency from one exposed fiber core to the other.

Reference will now be made to the drawings.

FIGS. 1A-1B illustrate an example optical fiber 100, arranged in accordance with at least some embodiments described herein. FIG. 1A is a perspective view of the optical fiber 100 and FIG. 1B is a cross-sectional view of the optical fiber 100 in the cutting plane 1B-1B of FIG. 1A. The optical fiber 100 may include a fiber core 102, a cladding layer 104, and a jacket 106.

The fiber core 102 may include a transparent material such as glass or plastic and may have an index of refraction $n_1$. Examples of suitable transparent materials for the fiber core 102 may include, but are not limited to, silica, fluorozirconate, fluoroaluminate, chalcogenide glasses, and sapphire. Alternately or additionally, the fiber core 102 may be doped with a dopant. Examples of suitable dopants may include, but are not limited to, titanium, germanium dioxide, and rare earth elements such as erbium.

The cladding layer 104 may surround all or most of the fiber core 102. Similar to the fiber core 102, the cladding layer 104 may include a transparent material such as glass or plastic and may have an index of refraction $n_2$. When $n_1$ is larger than $n_2$, light propagating along the optical fiber 100 may generally be confined within the fiber core 102 by the process of total internal reflection, although some of the light may escape. Examples of suitable transparent materials for the cladding layer 104 may include, but are not limited to, silica, fluorozirconate, fluoroaluminate, chalcogenide glasses, and sapphire. Alternately or additionally, the cladding layer 104 may be doped with a dopant. Examples of suitable dopants may include, but are not limited to, titanium, germanium dioxide, and rare earth elements such as erbium.

The jacket 106 may surround all or most of the cladding layer 104. Although not illustrated in FIGS. 1A-1B, the optical fiber 100 may further include a buffer layer between the cladding layer 104 and the jacket 106. The jacket 106, and the optional buffer layer, may protect the fiber core 102 and the cladding layer 104 and/or may strengthen the optical fiber 100 without contributing to its optical waveguide properties. The jacket 106 and/or the buffer layer may include, but are not limited to, glass, plastic, and resin.

As illustrated in FIG. 1B, the fiber core may include a core diameter $D_1$, the cladding layer 104 may include a clad diameter $D_2$, and the jacket 106 may include a jacket diameter $D_3$. The diameters $D_1$, $D_2$, and $D_3$ may vary depending on an application for which the optical fiber 100 is used or is intended to be used. For instance, in communication applications, the optical fiber 100 may include a single mode fiber or a multimode fiber. When the optical fiber 100 is implemented as a single mode fiber, the core diameter $D_1$ may be about 9 micrometers (μm), the clad diameter $D_2$ may be about 125 μm, and the jacket diameter $D_3$ may be about 250 μm. More generally, the core diameter $D_1$ may be in a range from about 7 μm to about 10 μm, the clad diameter $D_2$ may be in a range from about 123 μm to about 127 μm, and the jacket diameter $D_3$ may be in a range from about 230 μm to about 260 μm.

When the optical fiber 100 is implemented as a multimode fiber, the core diameter $D_1$ may be about 62.5 micrometers (μm), while the clad diameter $D_2$ and the jacket diameter $D_3$ may be the values listed above. More generally, the core diameter $D_1$ may be in a range from about 61 μm to about 64 μm, while the clad diameter $D_2$ and the jacket diameter $D_3$ may be in the ranges listed above.

The fiber core 102, the cladding layer 104, and the jacket 106 may generally extend from one end of the optical fiber 100 to the other. In some embodiments, a portion of the fiber core 102 may extend beyond the cladding layer 104 and the jacket 106 at one or both ends of the optical fiber 100. The portion of the fiber core 102 that extends beyond the cladding layer 104 may be referred to as an exposed fiber core in this and other embodiments. An exposed fiber core may be formed in an optical fiber by removing a portion of a cladding layer from an end of the optical fiber, or by forming the optical fiber with the exposed fiber core ab initio, as described in more detail below. The portion of the optical fiber 102 that includes at least the cladding layer 104 and the fiber core 102 may be referred to as a clad portion in this and other embodiments.

Figure 2:
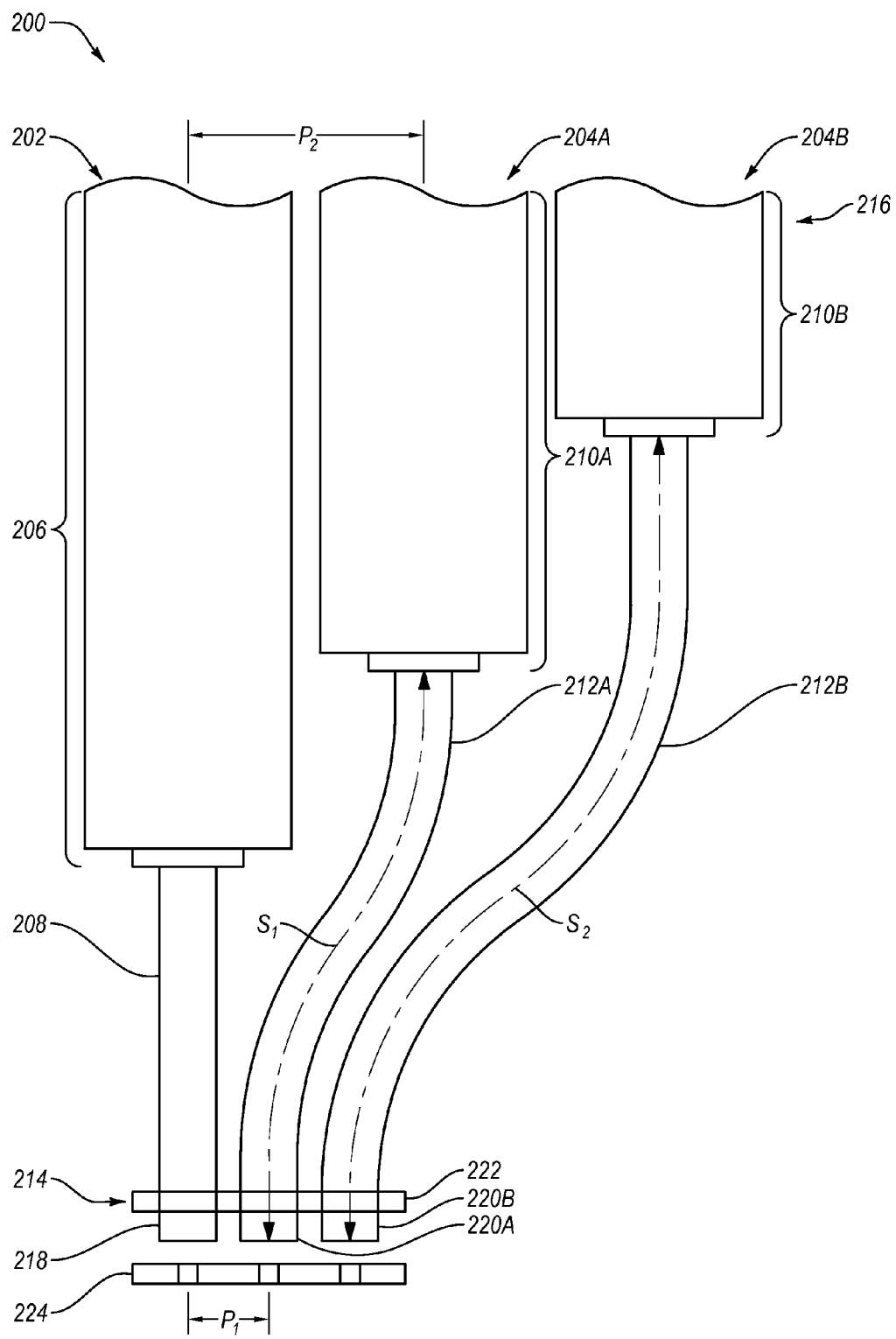
FIG. 2 illustrates an example fiber bundle that may include multiple optical fibers.

FIG. 2 illustrates an example fiber bundle 200 that may include multiple optical fibers 202, 204A, 204B, arranged in accordance with at least some embodiments described herein. Each of the optical fibers 202, 204A, 204B may generally be configured similar to the optical fiber 100 of FIGS. 1A-1B and may include a fiber core substantially surrounded by a cladding layer, and the cladding layer substantially surrounded by a jacket.

The optical fibers 202, 204A, 204B may include a first optical fiber 202 and one or more second optical fibers 204A, 204B (collectively "second optical fibers 204"). The first optical fiber 202 includes a first clad portion 206 and a first exposed fiber core 208 that extends from the first clad portion 206. The first clad portion 206 may generally include at least a cladding layer of the first optical fiber 202 and an unexposed portion of a fiber core of the first optical fiber that is continuous with the first exposed fiber core 208. The first clad portion 206 may additionally include a jacket of the first optical fiber 202. As such, a diameter of the first clad portion 206 may be a clad diameter and/or a jacket diameter of the first optical fiber 202.

Each of the second optical fibers 204 includes a second clad portion 210A, 210B (collectively "second clad portions 210") and a second exposed fiber core 212A, 212B (collectively "second exposed fiber cores 212") that extends from the corresponding second clad portion 210. In some embodiments, each of the second clad portions 210 may be arranged substantially parallel to the first clad portion 206. Each of the second clad portions 210 may generally include at least a cladding layer of the corresponding second optical fibers 204 and an unexposed portion of a fiber core of the corresponding second optical fibers that is continuous with the corresponding second exposed fiber cores 212. Each of the second clad portions 210 may additionally include a jacket of the corresponding second optical fibers 204. As such, a diameter of each of the second clad portions 210 may be a clad diameter and/or a jacket diameter of the corresponding second optical fiber 204.

The fiber bundle 200 may further include a condensed region 214 and a non-condensed region 216. In the condensed region 214, a first distal end 218 of the first exposed fiber core 208 may be arranged substantially parallel to a second distal end 220A, 220B (collectively "second distal ends 220") of each second exposed fiber core 212. Adjacent distal ends 218, 220 in the condensed region 214 may have a first center-to-center spacing, or pitch, $P_1$. The first center-to-center spacing $P_1$ may be in a range between approximately 10 μm and approximately 100 μm, such as about 50 μm. Alternately or additionally, the first center-to-center spacing $P_1$ may be less than a diameter of the first clad portion 206 and/or of the second clad portions 210. More particularly, the first center-to-center spacing $P_1$ may be less than the jacket diameter, or even less than the clad diameter, of the first clad portion 206 and/or of the second clad portions 210. Alternately or additionally, the first center-to-center spacing $P_1$ may be approximately equal to a core diameter of the first exposed fiber core 208 and/or of the second exposed fiber cores 212.

The non-condensed region 216 may include the first clad portion 206 and the second clad portions 210. The first clad portion 206 and the second clad portions 210 may be arranged substantially parallel to each other. Adjacent clad portions 206, 210 in the non-condensed region 216 may have a second center-to-center spacing, or pitch, $P_2$ that is greater than the first center-to-center spacing $P_1$. The second center-to-center spacing $P_2$ may be in a range between approximately 150 μm and approximately 500 μm, such as about 250 μm. Alternately or additionally, the second center-to-center spacing $P_2$ may be approximately equal to a diameter of the first clad portion 206 and/or of the second clad portions 210. Alternately or additionally, the second center-to-center spacing $P_2$ may be at least 50% greater than the first center-to-center spacing $P_1$.

The fiber bundle 200 may further include a ferrule 222 configured to secure the first distal end 218 of the first exposed fiber core 208 and the second distal ends 220 of the second exposed fiber cores 212 at the first center-to-center spacing $P_1$ and substantially parallel to each other.

The fiber bundle 200 may be implemented or included in an optical assembly that additionally includes an array of transducers 224, such as an array of source emitters, an array of optical detectors, or an array of source emitters and optical detectors. Adjacent transducers within the array of transducers 224 may be spaced at a nominal pitch substantially equal to the first center-to-center spacing $P_1$. For example, when the array of transducers 224 includes an array of source emitters, the source emitters may be arranged to emit optical signals into the first distal end 218 of the first exposed fiber core 208 and the second distal end 220 of each second exposed fiber core 212, where adjacent source emitters in the array of source emitters may be spaced at a nominal pitch substantially equal to the first center-to-center spacing $P_1$.

Although not illustrated in FIG. 2, the first optical fiber 202 may further include a first mode stripper layer that surrounds at least a portion of a cladding layer of the first optical fiber 202, while each of the second optical fibers 204 may further include a second mode stripper layer that surrounds at least a portion of a cladding layer of the corresponding second optical fiber 204. In some embodiments, some modes of light that enter the first distal end 218 and/or the second distal ends 220 may become cladding-guided modes in the first clad portion 206 and/or the second clad portions 210 of the optical fibers 202, 204. Whereas cladding-guided modes may be undesirable in at least some applications, the first mode stripper layer and/or the second mode stripper layer may generally be configured to suppress the cladding-guided modes. For example, the first mode stripper layer and/or the second mode stripper layers may have a thickness that is greater than a thickness of the corresponding cladding layer such that cladding-guided modes that enter the first and/or second mode stripper layers may be suppressed by being extracted from a trailing surface of the corresponding mode stripper layer. An example embodiment of a mode stripper layer is illustrated in and described with respect to FIG. 7B.

In some embodiments, the first mode stripper layer and/or the second mode stripper layer may include a transparent material such as glass or plastic with an index of refraction that is higher than an index of refraction of the first exposed fiber core 208 and/or the second exposed fiber cores 212. Alternately or additionally, the index of refraction of the first and/or second mode stripper layers may match or substantially match an index of refraction of the corresponding cladding layer.

Alternately or additionally, the first optical fiber 202 may further include a first mode-conversion reflector that surrounds at least a portion of the first exposed fiber core 208, while each of the second optical fibers 204 may further include a second mode-conversion reflector that surrounds at least a portion of the corresponding second exposed fiber core 212. An example mode-conversion reflector that may be suitable for the first mode-conversion reflector and/or the second mode-conversion reflectors is described in more detail with respect to FIG. 8. Each of the first and second mode-conversion reflectors may be configured to convert at least some higher order modes, such as modes that may otherwise become cladding-guided modes in the first clad portion 206 and/or the second clad portions 210, to lower order modes, as described in more detail below. In some embodiments, each of the first and second mode-conversion reflectors may include a diffuse reflector.

Each of the second exposed fiber cores 212 may include a second exposed fiber core length $S_1$, $S_2$ that depends on a lateral displacement between a center of each corresponding second clad portion 210 and a center of each corresponding second distal end 220. In some embodiments, the second exposed fiber core length $S_1$, $S_2$ of each second exposed fiber core 212 may be greater than or equal to a target length S(D) determined according to:

$$S(D) = 4 \cdot R \cdot a \sin [0.5(D/R)^{1/2}]$$

where R is a minimum bend radius of the corresponding second optical fiber 204, a sin is an inverse sine function, and D is the lateral displacement between the center of each corresponding second clad portion 210 and the center of each corresponding second distal end 220. More particularly, R may be a minimum bend radius of the corresponding second exposed fiber core 212, which may be less than a minimum bend radius of the corresponding second optical fiber 204 in, e.g., portions of the second optical fiber 204 that include a cladding layer and/or a jacket.

Figure 3:
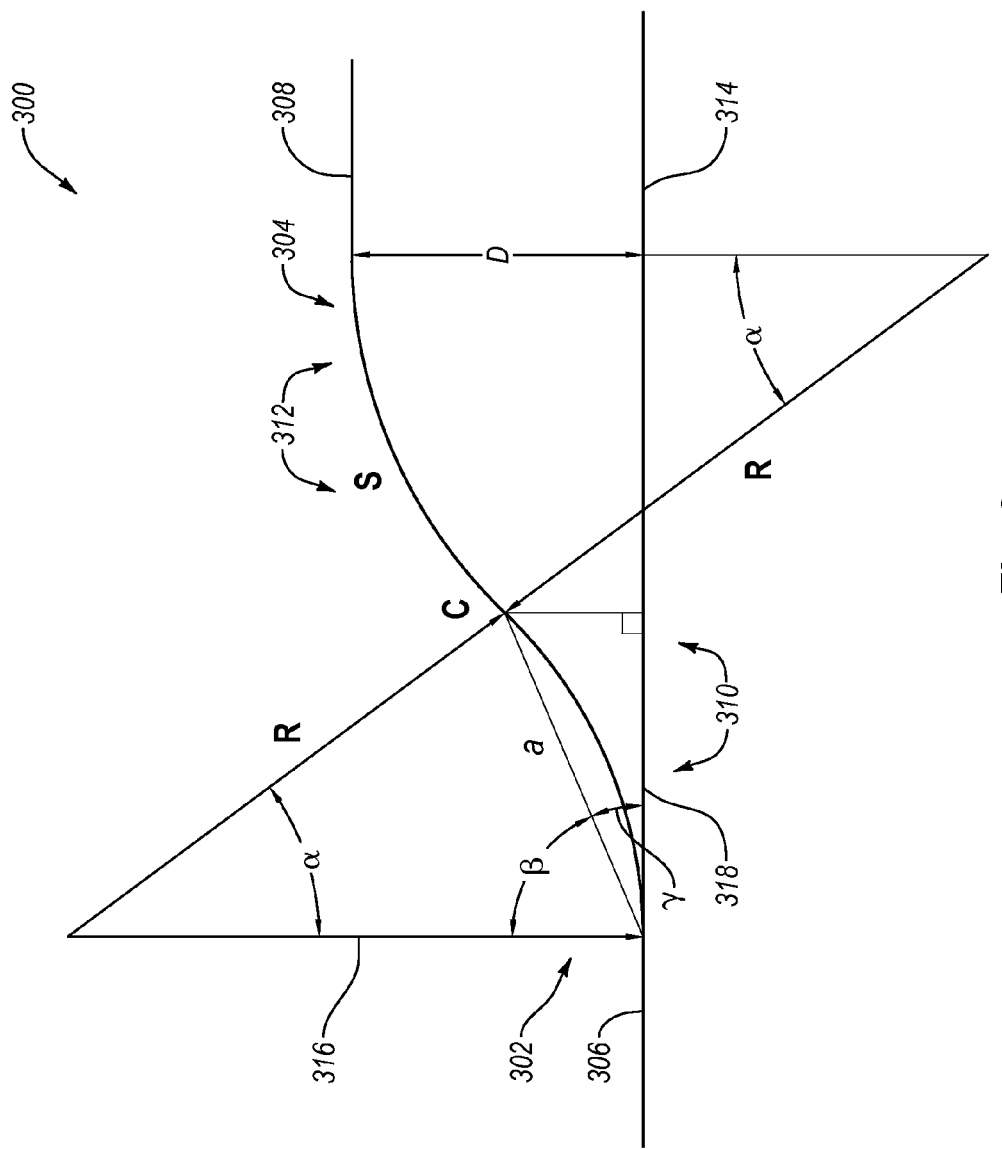
FIG. 3 is a diagram of an exposed fiber core.

FIG. 3 is a diagram of an exposed fiber core 300, arranged in accordance with at least some embodiments described herein. A derivation of the example formula for S(D) set forth above will now be provided with respect to FIG. 3. The exposed fiber core 300 may include a distal end 302 and a proximal end 304. The distal end 302 may be an end of the exposed fiber core 300 that is furthest from a clad portion of a corresponding optical fiber from which the exposed fiber core 300 extends. The proximal end 304 may be the opposite end of the exposed fiber core 300, e.g., the end extending from the clad portion of the corresponding optical fiber. The two ends 302, 304 are labeled for convenience in the discussion that follows; however, the distal end 302 and the proximal end 304 may alternately be reversed due to the symmetry of the exposed fiber core 300 of FIG. 3.

In a fiber bundle, such as the fiber bundle 200 of FIG. 2, an optical axis 306 of the distal end 302 may be parallel to an optical axis 308 of the proximal end 304. The optical axis 308 of the proximal end 304 may be laterally offset from the optical axis 306 of the distal end 302 by a distance D. The distance D may depend on a relative position of a corresponding optical fiber within the fiber bundle. For example, with combined reference to FIGS. 2 and 3, the second exposed fiber core 212B furthest from the first exposed fiber core 208 may have a larger distance D than the second exposed fiber core 212A.

Returning to FIG. 3, the exposed fiber core 300 may have a length S. When the optical axes 306, 308 of the distal end 302 and the proximal end 304 are parallel, the exposed fiber core 300 may have an S-like shape including two curved portions 310, 312 where the curved portion 310 transitions to the curved portion 312 at an inflection point C of the exposed fiber core 300. It may be assumed that each of the two curved portions 310, 312 is an arc having a central angle α and a common radius of curvature equal to a minimum bend radius R of the exposed fiber core 300 to prevent or reduce microbending and/or macrobending optical losses in the exposed fiber core 300. In other embodiments, the radius of curvature of each of the two curved portions 310, 312 may be greater than the minimum bend radius R, in which case the length S of the exposed fiber core 300 may be greater than the target length S(D). It may be assumed for the remaining discussion of FIG. 3, however, that the radius of curvature of each of the two curved portions 310, 312 is equal to the minimum bend radius R such that the length S of the exposed fiber core 300 is equal to the target length S(D). The geometry of the exposed fiber core 300 may be such that the inflection point C is located midway between the distal end 302 and the proximal end 304 at a distance D/2 from a reference line 314 co-linear with the optical axis 306 of the distal end 302.

Under the conditions set forth above, each of the two curved portions 310, 312 may have an arc length equal to $a \cdot R$, where a and any other angles discussed herein are in radians unless otherwise noted. As such, the length S of the exposed fiber core 300 may be equal to $2 \cdot \alpha \cdot R$. As explained previously, the distance D may vary, e.g., depending on a relative position of a corresponding optical fiber within a fiber bundle, which may affect the central angle α, and thus the length S, when R is fixed. Accordingly, the length S may be expressed as a function of D according to $S(D)=2 \cdot \alpha \cdot R$, where a has a relationship with D set forth below.

FIG. 3 further includes an isosceles triangle 316 and a right triangle 318, each having one vertex at the distal end 302 and another vertex at the inflection point C. The isosceles triangle 316 has two equal sides, each having a length equal to the minimum bend radius R. The isosceles triangle 316 also has a base of length a, which base is a hypotenuse of the right triangle 318. The isosceles triangle 316 and the right triangle 318 respectively define angles β and γ, where $\beta+\gamma=\pi/2$. Because a sum of all three angles of any given triangle equals π, the angles of the isosceles triangle 316 can be related according to $\alpha+2 \cdot \beta=\pi$, which is equivalent to $\alpha/2+\beta=\pi/2$. From the formulas $\beta+\gamma=\pi/2$ and $\alpha/2+\beta=\pi/2$, it can be determined that $\alpha/2=\gamma$.

Taking the sine, e.g., sin(x), of both sides of the equation $\alpha/2=\gamma$ yields $\sin(\alpha/2)=\sin \gamma$. Using the trigonometric identity that the sine of an angle in a right triangle is equal to the side opposite the angle divided by the hypotenuse, it can be determined that $\sin(\alpha/2)=a/(2 \cdot R)$ and $\sin \gamma=D/(2 \cdot a)$, which combined with the formula $\sin(\alpha/2)=\sin \gamma$ yields $a/(2 \cdot R)=D/(2 \cdot a)$. Solving the equation $a/(2 \cdot R)=D/(2 \cdot a)$ for a yields $a=(D \cdot R)^{1/2}$. Substituting $a=(D \cdot R)^{1/2}$ in $\sin(\alpha/2)=a/(2 \cdot R)$ yields $\sin(\alpha/2)=(D \cdot R)^{1/2}/(2 \cdot R)$, which is equivalent to $\sin(\alpha/2)=0.5(D/R)^{1/2}$. Taking the inverse sine, e.g., a sin(x), of both sides of the equation $\sin(\alpha/2)=0.5(D/R)^{1/2}$ yields $\alpha/2=a \sin [0.5(D/R)^{1/2}]$, or $\alpha=2 \cdot a \sin [0.5(D/R)^{1/2}]$. Substituting $\alpha=2 \cdot a \sin [0.5(D/R)^{1/2}]$ in the formula for the length S of the exposed fiber core 300, e.g., $S(D)=2 \cdot a \cdot R$, yields $S(D)=4 \cdot R \cdot a \sin [0.5(D/R)^{1/2}]$, which is the formula for the target length S(D) set forth previously.

The formula $S(D)=4 \cdot R \cdot a \sin [0.5(D/R)^{1/2}]$ may be used to determine the target length S(D) for a fiber bundle with any geometric arrangement, including linear fiber arrays in which distal ends of optical fibers in the fiber bundle are condensed linearly, circular fiber arrays in which distal ends of optical fibers in the fiber bundle are condensed within a circular region, or other geometries.

With combined reference to FIGS. 2 and 3, the fiber bundle 200 may include the first optical fiber 202 having the first clad portion 206 and the first exposed fiber core 208 that extends from the first clad portion 206. The first exposed fiber core 208 may have the first distal end 218. The fiber bundle 200 may additionally include the second optical fibers 204 arranged around the first optical fiber 202, although illustrated in FIG. 2 as being arranged to one side of the first optical fiber 202. Each second optical fiber 204 may have the second clad portion 210 and the second exposed fiber core 212 that extends from the second clad portion 210, each of the second exposed fiber cores 212 having the corresponding second exposed fiber core length $S_1$, $S_2$. In some embodiments, each second exposed fiber core 212 may include a bend region (e.g., made up of the two curved portions 310, 312 of FIG. 3) in which the corresponding second exposed fiber core 212 is displaced by a corresponding displacement distance (e.g., the distance D of FIG. 3) towards the first exposed fiber core 208. The second optical fibers 204 may have different displacement distances. For each second optical fiber 204, the corresponding second exposed fiber core length $S_1$, $S_2$ may be correlated with the displacement distance. For instance, the second exposed fiber core length $S_1$, $S_2$ may increase with increasing displacement distance.

In some embodiments, each second clad portion 210 may be substantially parallel to the first clad portion 206. Each second exposed fiber core 212 may have a second distal end 220. The first distal end 218 of the first exposed fiber core 208 may be substantially parallel to the second distal end 220 of each second exposed fiber core 212. Alternately or additionally, each second exposed fiber core length $S_1$, $S_2$ may be greater than or equal to $4 \cdot R \cdot a \sin [0.5(D/R)^{1/2}]$, where R is a minimum bend radius of the second optical fiber 204, a sin is an inverse sine function, and D is the displacement distance or lateral displacement as described above.

Embodiments described herein may alternately or additionally include an optical assembly including multiple transducers and a fiber bundle. The transducers may include the array of transducers 224 of FIG. 2, for example. The multiple transducers may have a transducer spacing between a first transducer and a second transducer of the multiple transducers. The fiber bundle may include the fiber bundle 200 of FIG. 2, for instance, and may include a first optical fiber that has a first clad portion and a first exposed fiber core that extends from the first clad portion, and a second optical fiber that has a second clad portion and a second exposed fiber core that extends from the second clad portion, where the second clad portion is substantially parallel to the first clad portion. The fiber bundle may further include a condensed region and a non-condensed region. In the condensed region, a first distal end of the first exposed fiber core may be arranged substantially parallel to a second distal end of the second exposed fiber core, where the first distal end and the second distal end have a first center-to-center spacing. The non-condensed region may include the first clad portion and the second clad portion, where the first clad portion and the second clad portion in the non-condensed region have a second center-to-center spacing. The second center-to-center spacing may be greater than the first center-to-center spacing. The first center-to-center spacing may be approximately equal to the transducer spacing.

In some embodiments, each of the multiple transducers may be optically coupled to a selected optical fiber of the fiber bundle, where the first distal end is optically coupled to the first transducer, and the second distal end is optically coupled to the second transducer. The multiple transducers may include multiple source emitters, such as a laser. Alternately or additionally, the multiple transducers may include an optical detector.

Figure 4:
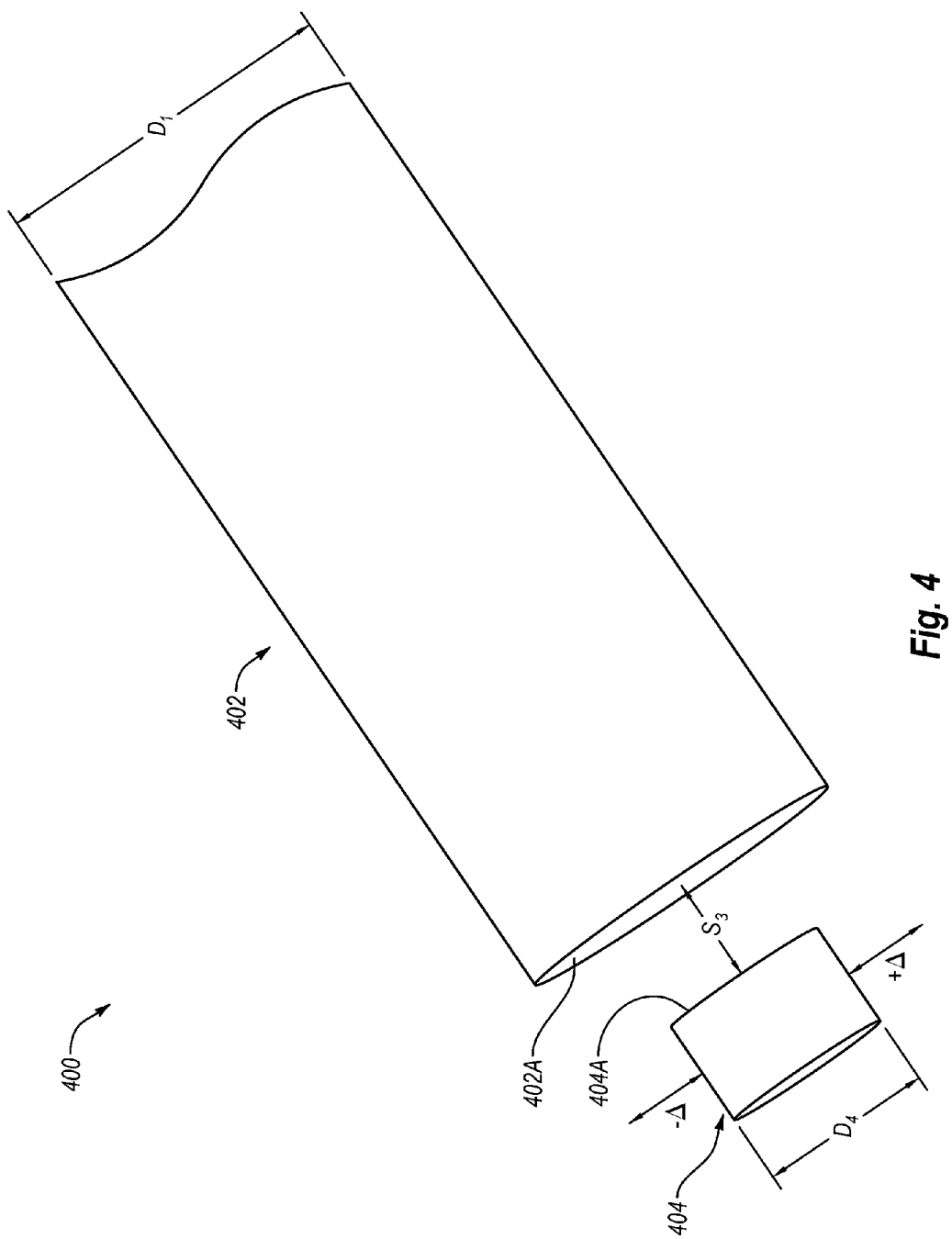
FIG. 4 illustrates an example optical assembly including an exposed fiber core and a source emitter.

FIG. 4 illustrates an example optical assembly 400 including an exposed fiber core 402 and a source emitter 404, arranged in accordance with at least some embodiments described herein. The exposed fiber core 402 may be part of an optical fiber such as the first optical fiber 202 and/or the second optical fibers 204 of FIG. 2, and/or may be implemented in a fiber bundle such as the fiber bundle 200 of FIG. 2. In an example embodiment, each of the first exposed fiber core 208, the second exposed fiber cores 212, and the transducers in the array of transducers 224 of FIG. 2 may generally be configured and/or arranged analogous to the exposed fiber core 402 and the source emitter 404 of FIG. 4, for example.

In an example embodiment, the source emitter 404 may have a circular light-emitting surface 404A that uniformly, or substantially uniformly, emits light that has a Lambertian angular distribution. The Lambertian angular distribution may be ±60°, for example.

The exposed fiber core 402 may have a core diameter $D_1$ and the source emitter 404 may have a source diameter $D_4$. The source diameter $D_4$ may be a diameter of an active region of the source emitter 404. The source emitter 404 may have a lateral position tolerance A with respect to the exposed fiber core 402, meaning an optical emission axis of the source emitter 404 may be nominally coaxial with an optical axis of the exposed fiber core 402, although in reality the optical emission axis of the source emitter 404 may deviate laterally from the optical axis of the exposed fiber core 402 by up to ±Δ. In some embodiments, a sum of the source diameter $D_4$ and the lateral position tolerance ±Δ may be less than the core diameter $D_1$. By way of example, the source diameter $D_4$ may be approximately 25 µm, the lateral position tolerance ±Δ may be ±10 µm, and the core diameter $D_1$ may be approximately 50 µm for a multimode optical fiber.

Alternately or additionally, a distance $S_3$ between the light-emitting surface 404A and a light entrance surface 402A of the exposed fiber core 402 may take into account the Lambertian angular distribution of the source emitter 404 such that a predetermined percentage of light emitted by the source emitter 404 may be incident on the light entrance surface 402A of the exposed fiber core 402. For example, the distance $S_3$ between the light-emitting surface 404A and the light entrance surface 402A may be less than or equal to a threshold distance at which 90% of light emitted by the source emitter 404 is incident on the light entrance surface 402A of the exposed fiber core 402. Where the source diameter $D_4$ is approximately 25 µm and the core diameter $D_1$ is approximately 50 µm, the threshold distance may be approximately 10 µm.

Alternately or additionally, the exposed fiber core 402 may have an index of refraction that is greater than an index of refraction of the corresponding cladding layer of the optical fiber that includes the exposed fiber core 402 and the cladding layer. For instance, if the cladding layer has an index of refraction of 1.34, the exposed fiber core 402 may have an index of refraction greater than 1.34, such as 1.47. In this example, the exposed fiber core 402 may have a numerical aperture (NA) of about 0.6, which indicates an entrance cone of ±37°. As such, all, or substantially all, light rays emitted by the source emitter 404 may enter the exposed fiber core 402 through the light entrance surface 402A. In particular, light rays emitted by the source emitter 404 and incident on the light entrance surface 402A with virtually any incidence angle less than 90° may be refracted into the exposed fiber core 402 with an angle smaller than 48.2°, such that the refracted light rays may propagate through the exposed fiber core 402 with a propagation angle less than 41.8° (90°−48.2°).

Figure 5:
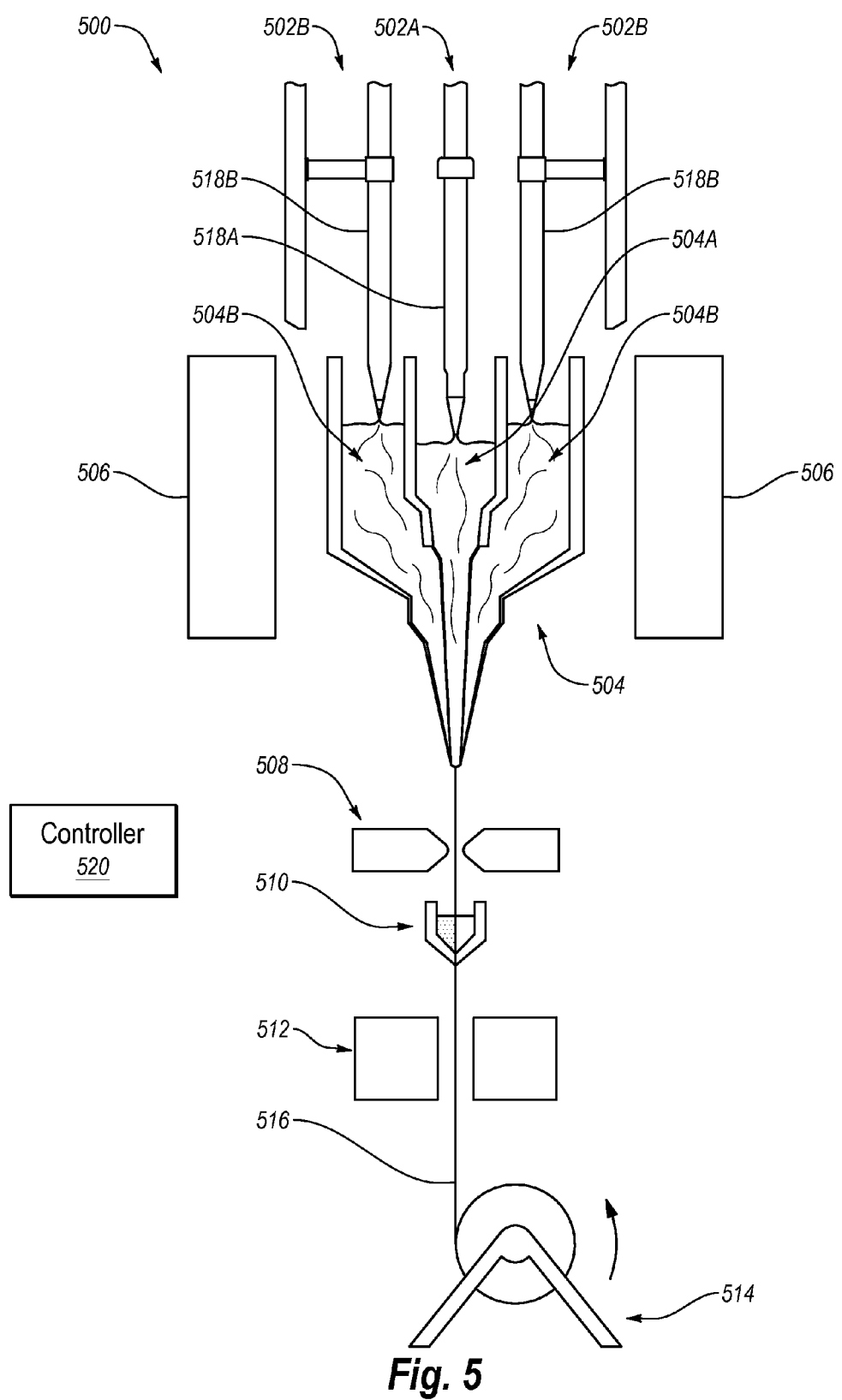
FIG. 5 is a schematic diagram of an example apparatus for forming an optical fiber with an exposed fiber core.

FIG. 5 is a schematic diagram of an example apparatus 500 for forming an optical fiber with an exposed fiber core, arranged in accordance with at least some embodiments described herein. The apparatus 500 may include feed rods 502A, 502B, a double crucible 504, heating elements 506, a thickness monitor 508, a coating applicator 510, a coating curing oven 512, and a takeup drum 514. The double crucible 504 may include a first crucible chamber 504A and a second crucible chamber 504B. The first crucible chamber 504A may be surrounded, or at least partially surrounded, by the second crucible chamber 504B. Alternately or additionally, the second crucible chamber 504B may be concentric with the first crucible chamber 504A.

In general, the apparatus 500 may be configured to form an optical fiber 516 from core material 518A and cladding layer material 518B fed into the double crucible 504 by the feed rods 502A, 502B. In more detail, core material 518A and cladding layer material 518B fed into the double crucible 504 may be melted to liquid form by heat generated by the heating elements 506, and may be collected in a corresponding one of the first crucible chamber 504A or the second crucible chamber 504B. The melted core material 518A and cladding layer material 518B is drawn through the double crucible 504 to form the optical fiber 516.

The thickness monitor 508 may be configured to ensure the optical fiber 516 is drawn through the double crucible 504 at a target thickness. Feedback from the thickness monitor 508 may be provided to a controller 520 communicatively coupled to one or more of the other components of the apparatus 500. Based on the feedback from the thickness monitor 508, the controller 522 may adjust settings on one or more of the components of the apparatus 500 to substantially maintain a thickness of the optical fiber 516 at the target thickness.

The coating applicator 510 may be configured to apply a coating to the optical fiber 516. The coating may include a resin or other coating configured to, for instance, strengthen or protect the optical fiber 516. The coating curing oven 512 may be configured to cure the coating as the optical fiber 516 passes therethrough. The takeup drum 514 may be configured to spool the optical fiber 516 as it is formed.

As previously indicated, an exposed fiber core at one or both ends of an optical fiber may be formed by removing a portion of a cladding layer from an end of the optical fiber, or by forming the optical fiber with the exposed fiber core ab initio. The apparatus 500 is one example of a system or apparatus that may be used to form an optical fiber with an exposed fiber core ab initio, as described in more detail with respect to FIGS. 6A and 6B.

Figure 6A:
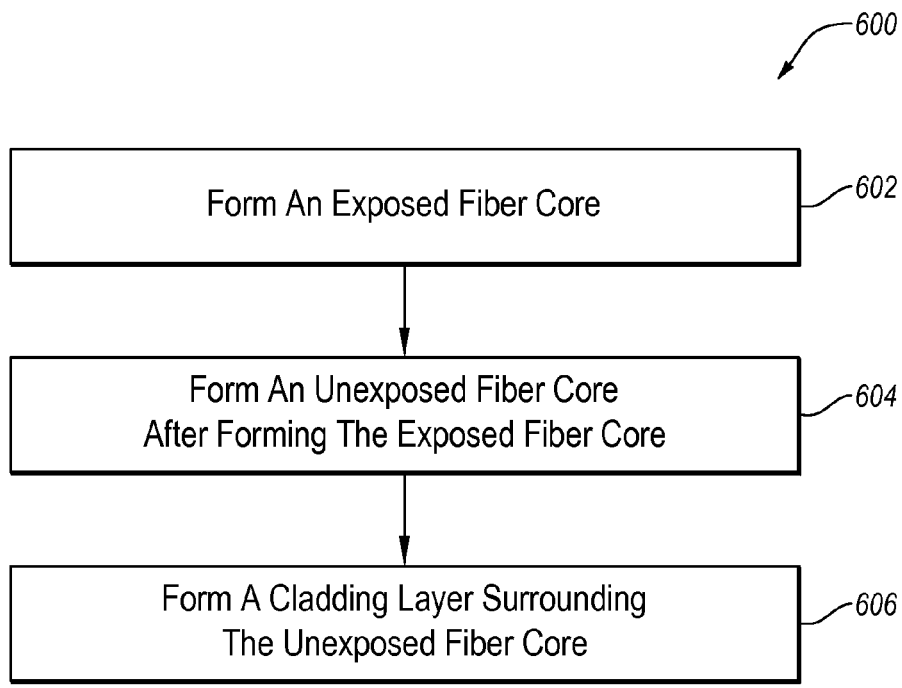
FIG. 6A shows a flow diagram of an example method of forming an optical fiber.

FIG. 6A shows a flow diagram of an example method 600 of forming an optical fiber, arranged in accordance with at least some embodiments described herein. The method 600 may be performed in whole or in part by, e.g., the apparatus 500 of FIG. 5 or other suitable system or apparatus. For convenience in the discussion that follows, the method 600 may be discussed in the context of FIG. 5. The method 600 includes various operations, functions, or actions as illustrated by one or more of blocks 602, 604, and/or 606. The method 600 may begin at block 602.

In block 602 ("Form An Exposed Fiber Core"), an exposed fiber core is formed. The exposed fiber core may be formed by, for example, drawing core material 518A through the double crucible 504 without drawing cladding layer material 518B through the double crucible 504. Block 602 may be followed by block 604.

In block 604 ("Form An Unexposed Fiber Core After Forming The Exposed Fiber Core"), an exposed fiber core may be formed after forming the exposed fiber core. The unexposed fiber core may be formed continuous with the exposed fiber core. The unexposed fiber core may be formed after forming the exposed fiber core by, for example, drawing core material 518A through the double crucible 504 while simultaneously drawing cladding layer material 518B through the double crucible 504. Block 604 may be followed by block 606.

In block 606 ("Form A Cladding Layer Surrounding The Unexposed Fiber Core"), a cladding layer may be formed surrounding the unexposed fiber core. The cladding layer may be formed surrounding the unexposed fiber core by, for example, drawing cladding layer material 518B through the double crucible 504 while simultaneously drawing core material 518A through the double crucible 504. The cladding layer and the unexposed fiber core may form a clad portion, such as the clad portions 206, 210 of FIG. 2, from which the exposed fiber core extends. In some embodiments, the unexposed fiber core and the cladding layer may be formed substantially simultaneously.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, the method 600 may further include feeding core material into the first crucible chamber 504A of the double crucible 504 to form the exposed fiber core and the unexposed fiber core; feeding cladding layer material into the second crucible chamber 504B of the double crucible 504 to form the cladding layer; and separately controlling the feeding of core material into the first crucible chamber 504A and the feeding of cladding layer material into the second crucible chamber 504B to form the exposed fiber core prior to forming the cladding layer.

Alternately or additionally, the method 600 may further include determining a target length of the exposed fiber core prior to forming the exposed fiber core, where forming the exposed fiber core includes forming the exposed fiber core having a length substantially equal to the target length. The determining may be based on an expected lateral displacement between a center of the clad portion and a center of a distal end of the exposed fiber core when the optical fiber is assembled in a fiber bundle having a condensed region with multiple distal ends of multiple optical fibers and a non-condensed region with multiple clad portions of the multiple optical fibers. In some embodiments, the determining may include calculating the target length according to the formula $S(D)=4 \cdot R \cdot a \sin[0.5(D/R)^{1/2}]$ as already described herein.

Alternately or additionally, the method 600 may further include forming a mode stripper layer that surrounds at least a portion of the exposed fiber core, or forming a mode-conversion reflector that surrounds at least a portion of the exposed fiber core.

Figure 6B:
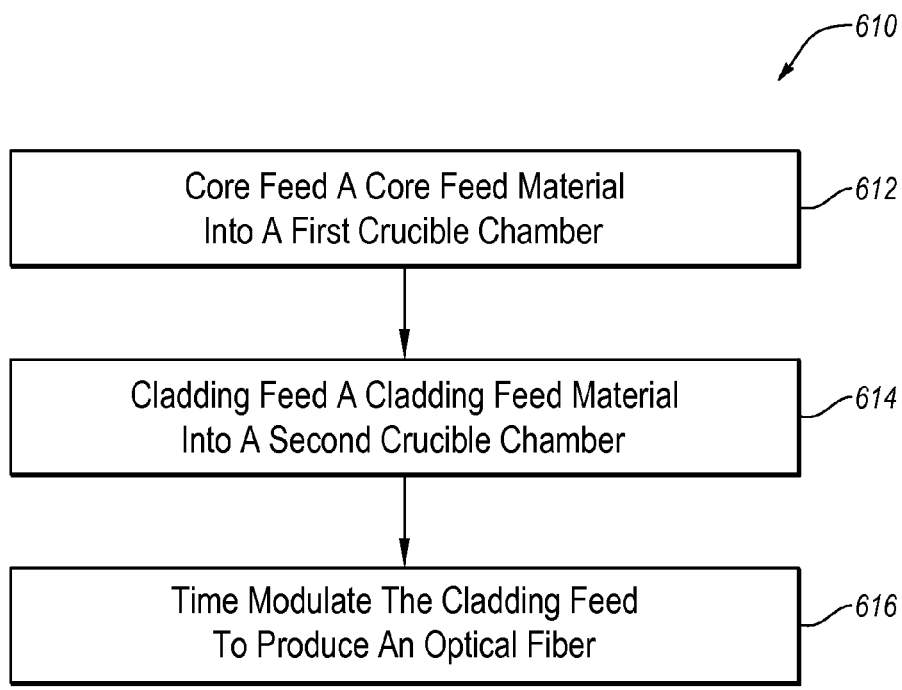
FIG. 6B shows a flow diagram of an example method of producing an optical fiber using a double crucible.

FIG. 6B shows a flow diagram of an example method 610 of producing an optical fiber using a double crucible, arranged in accordance with at least some embodiments described herein. The double crucible may have a first crucible chamber and a second crucible chamber surrounding the first crucible, the first crucible chamber having a first output, the second crucible chamber having a second output. Thus, the method 610 may be performed in whole or in part by, e.g., the apparatus 500 of FIG. 5 or other suitable system or apparatus. For convenience in the discussion that follows, the method 600 may be discussed in the context of FIG. 5. The method 610 includes various operations, functions, or actions as illustrated by one or more of blocks 612, 614, and/or 616. The method 610 may begin at block 612.

In block 612 ("Core Feed A Core Feed Material Into A First Crucible Chamber"), a core feed material may be core fed into the first crucible chamber. Core feeding the core feed material into the first crucible chamber may include feeding core material 518A into the first crucible chamber 504A of the double crucible 504. Block 612 may be followed by block 614.

In block 614 ("Cladding Feed A Cladding Feed Material Into A Second Crucible Chamber"), a cladding feed material may be clad fed into the second crucible chamber. Cladding feeding the cladding feed material into the second crucible chamber may include feeding cladding layer material 518B into the second crucible chamber 504B of the double crucible 504. Block 614 may be followed by block 616.

In block 616 ("Time Modulate The Cladding Feeding To Produce An Optical Fiber"), the cladding feeding may be time modulated to produce an optical fiber. Time modulating the cladding feeding to produce the optical fiber may include the controller starting and/or stopping the feeding of cladding layer material 518B into the second crucible chamber 504B of the double crucible 504.

In some embodiments, the optical fiber may have a core (or fiber core) including the core feed material. The optical fiber may also have a cladding (or cladding layer) including the cladding feed material. The optical fiber may have a spatially-modulated cladding structure arising from time modulating the cladding feeding. For example, the spatially-modulated cladding structure may include an exposed core region having no cladding.

Time modulating the cladding feeding may include varying a composition of the cladding feed material. Accordingly, the spatially-modulated cladding structure may include a spatially-varying cladding composition arising from varying the composition of the cladding feed material.

Alternately or additionally, the method 610 of FIG. 6B may further include time modulating the core feeding. Time modulating the core feeding may include varying a core composition of the core feed material.

Figure 7A:
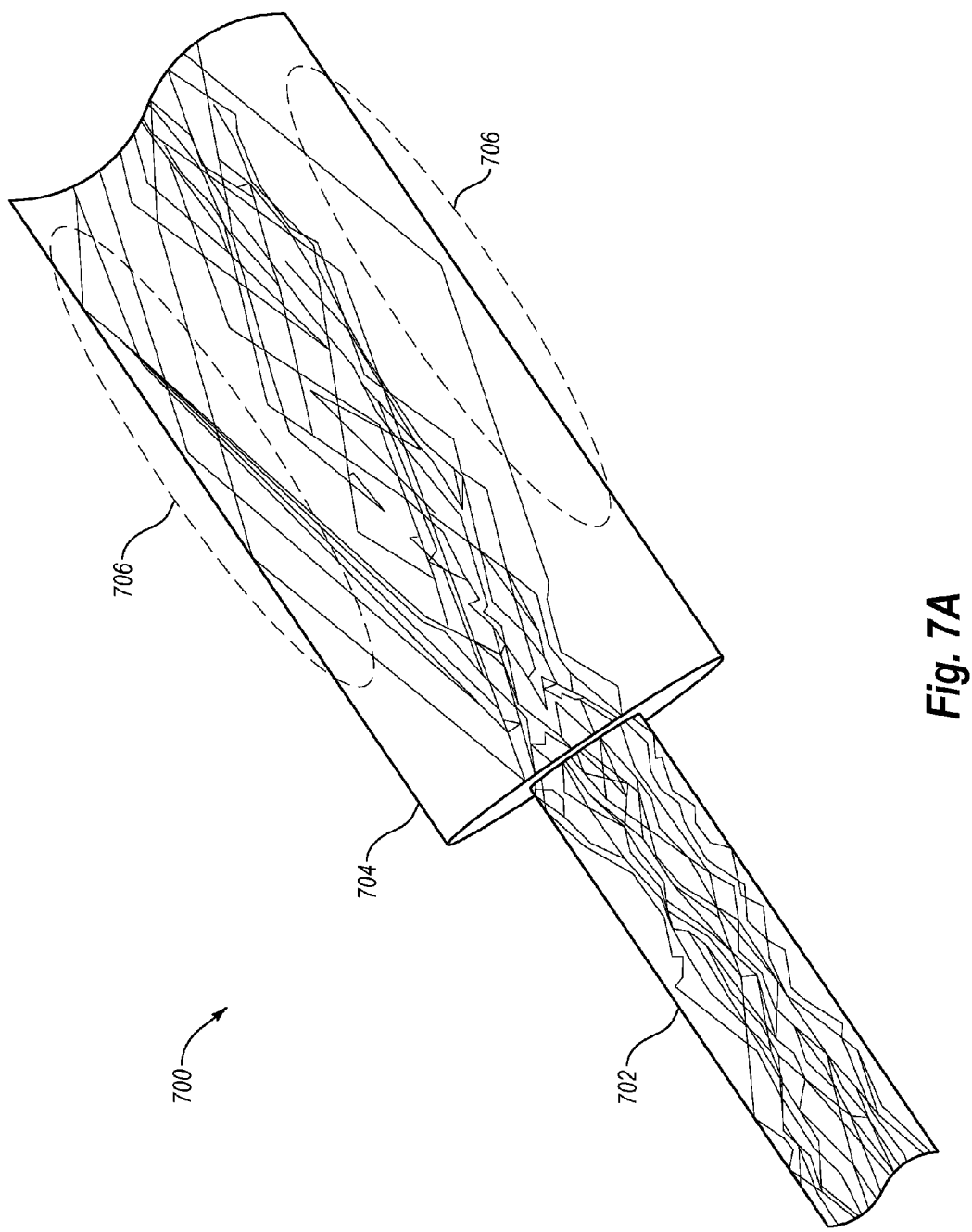
FIG. 7A is an example simulation of light modes in an example optical fiber including an exposed fiber core and a clad portion.

FIG. 7A is an example simulation of light modes in an example optical fiber 700 including an exposed fiber core 702 and a clad portion 704, arranged in accordance with at least some embodiments described herein. The optical fiber 700 may correspond to the optical fibers 202, 204 of FIG. 2, for example. In the illustrated embodiment, some higher order modes propagating in the exposed fiber core 702 may become cladding-guided modes 706 in the clad portion 704. To suppress the cladding-guided modes 706, the optical fiber 700 may further include a mode stripper layer that surrounds at least a portion of the clad portion 704, as described in more detail below with respect to FIG. 7B. As indicated previously, the mode stripper layer may have a higher index of refraction than the exposed fiber core 702 and may be configured to couple at least some of the higher order modes out of the exposed fiber core 702, which may suppress at least some of the cladding-guided modes 706 in the clad portion 704.

FIG. 7B illustrates an embodiment of the optical fiber 700 of FIG. 7A including a mode stripper layer 708, arranged in accordance with at least some embodiments described herein. As illustrated in FIG. 7B, the clad portion 704 may include a cladding layer 704A and an unexposed fiber core 704B of the optical fiber 700. The mode stripper layer 708 may have an index of refraction that is equal or substantially equal to an index of refraction of the cladding layer 704A. Accordingly, the cladding-guided modes 706 may enter the mode stripper layer 708 from the cladding layer 704A as illustrated in FIG. 7B. The mode stripper layer 708 may have a thickness $t_{ms1}$ that is much greater than a thickness $t_{cl}$ of the cladding layer. For example, the thickness $t_{ms1}$ may be in a range from about 3 to about 7 times the thickness $t_{cl}$. As such, the cladding-guided modes 706 that enter the mode stripper layer 708 may exit the mode stripper layer 708, and thus may be extracted from the optical fiber 700, through a trailing surface 708A of the mode strip layer 708.

Figure 8:
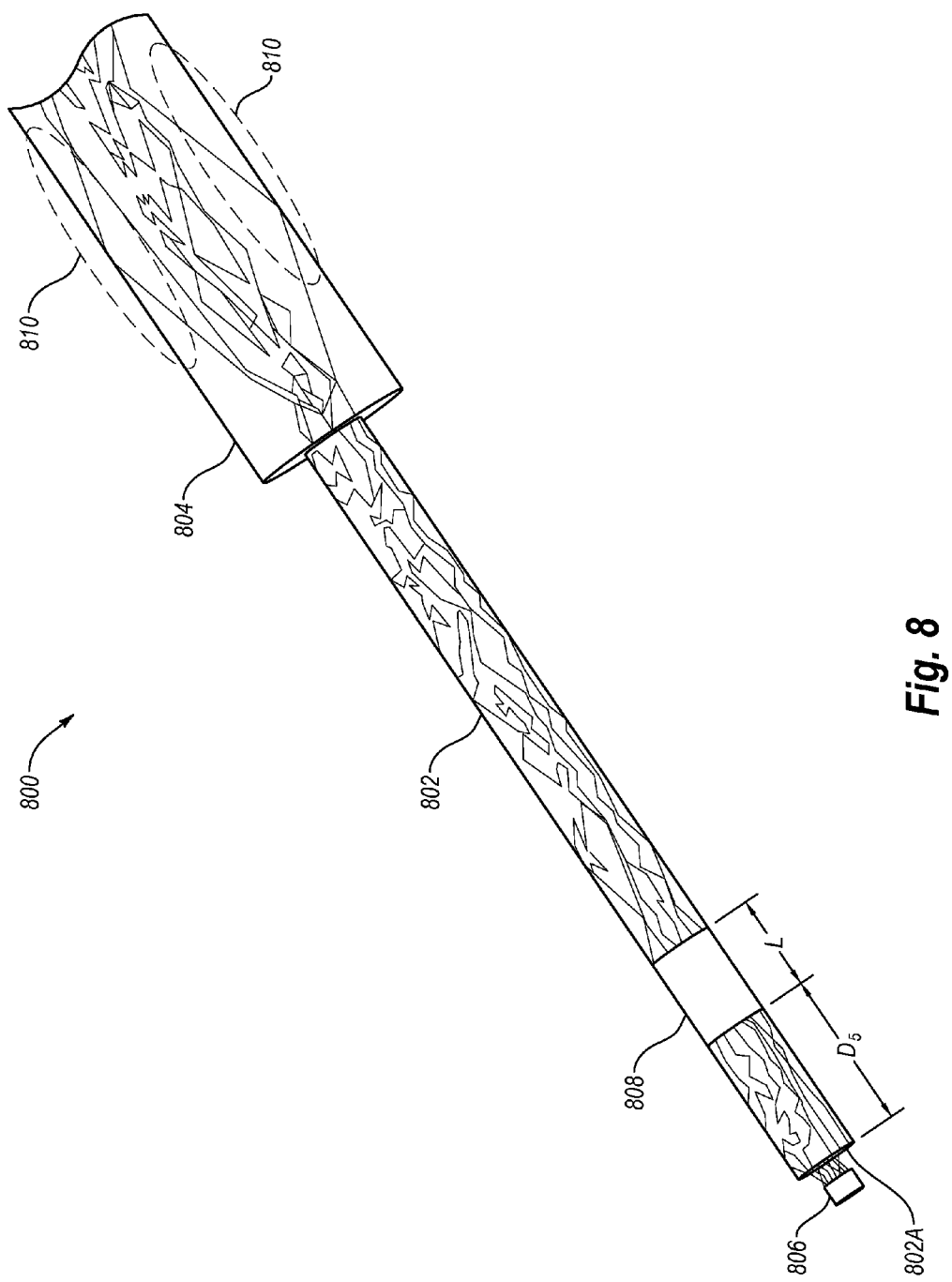
FIG. 8 is another example simulation of light modes in an example optical fiber including an exposed fiber core and a clad portion.

FIG. 8 is another example simulation of light modes in an example optical fiber 800 including an exposed fiber core 802 and a clad portion 804, arranged in accordance with at least some embodiments described herein. The optical fiber 800 may correspond to the optical fibers 202, 204 of FIG. 2, for example. FIG. 8 additionally includes a source emitter 806 configured to emit light into the exposed fiber core 802 and a mode-conversion reflector 808 that surrounds at least a portion of the exposed fiber core 802. The mode-conversion reflector 808 may be configured to convert at least some higher order modes propagating in the exposed fiber core 802 to lower order modes guided primarily within an unexposed fiber core of the optical fiber 800 within the clad portion 804, thereby at least partially suppressing cladding-guided modes 810 in the clad portion 804. The mode-conversion reflector 808 may include a diffuse reflector, a grating, a diffractive reflector, a distributed Bragg reflector, or other reflector configured to change propagation direction of reflected light rays.

Higher order modes may interact with an outer surface of the exposed fiber core 802 relatively more frequently than lower order modes. Accordingly, the mode-conversion reflector 808 may be positioned on the exposed fiber core 802 at a position where higher order modes may be more likely to interact with the outer surface of the exposed fiber core 802 than lower order modes. For example, the mode-conversion reflector 808 may be positioned on the exposed fiber core 802 a distance $D_5$ from a light entrance surface 802A of the exposed fiber core 802. The distance $D_5$ may be approximately 20 μm, or more generally between about 10 μm and 25 μm, or between about 12 μm and 23 μm. Alternately or additionally, in multi-mode fiber, the distance $D_5$ may be approximately equal to a diameter of the exposed fiber core 802.

For single mode fiber, the source emitter 806 may include a single mode source emitter such that the distance $D_5$ may be significantly larger than the diameter of the exposed fiber core 802. In this and other embodiments, the distance $D_5$ may be approximately 100 μm. Alternately, the mode conversion reflector 808 may be omitted for single mode fiber.

In these and other embodiments, the mode-conversion reflector 808 may have a length L. The length L may depend on a diameter D of the exposed fiber core 802, a refractive index n1 of a cladding layer of the optical fiber 800, and a refractive index n2 of the exposed fiber core 802. The relationship between L, D, n1, and n2 may be expressed by the following equation.

$$L = D\left(\frac{1}{\tan\left(a\sin\left(\frac{n2}{n1}\right)\right)} - 1\right)$$

According to the foregoing equation, if the refractive index n1 of the cladding layer is 1.42 and the refractive index n2 of the exposed fiber core 802 is 1.5, then L may be equal to 1.93·D.

It can be determined from a comparison of the simulation of FIG. 8 to the simulation of FIG. 7A that the inclusion of the mode-conversion reflector 808 may result in fewer cladding-guided modes 810 in the optical fiber 800 than cladding-guided modes 706 in the optical fiber 700. The difference may be due to the conversion by the mode-conversion reflector 808 of at least some of the higher order modes in the exposed fiber core 802 to lower order modes.

To convert at least some of the higher order modes to lower order modes, the propagation angle of the at least some of the higher order modes within the exposed fiber core 802 may be changed by the mode-conversion reflector 808. Such a reflector may be a diffuse reflector that, in contrast to a specular reflector (which reflects an incident light ray at an angle equal to the incident angle), reflects the incident light in a Lambertian distribution. Other types of reflectors, such as gratings or diffractive reflectors, may also be used as the mode-conversion reflector 808.

The distribution of the reflected light from the mode-conversion reflector 808 within the exposed fiber core 802 may depend on a geometry of a surface of the exposed fiber core 802 and/or of the mode-conversion reflector 808 instead of the incident angle of light on the surface. A point on the surface at which light rays are reflected may be considered a Lambertian source. A Lambertian source may be characterized by values of the cosines of the angles relative to the perpendicular of the surface, as shown by the Lambertian light distribution formula $I(\theta)=(1/\pi)\cdot\cos(\theta)$.

Figure 9:
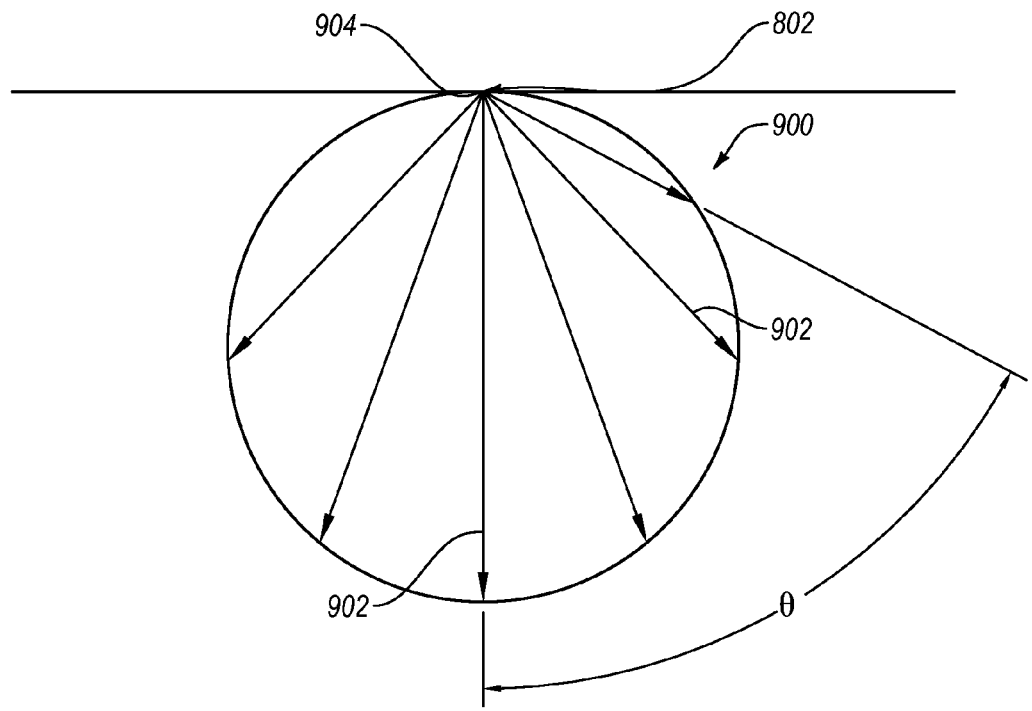
FIG. 9 illustrates an example of Lambertian light distribution for light rays emitting from a Lambertian source on a surface of the exposed fiber core of FIG. 8.

FIG. 9 illustrates an example of Lambertian light distribution 900 for light rays 902 emitting from a Lambertian source 904 on a surface of the exposed fiber core 802 of FIG. 8, arranged in accordance with at least some embodiments described herein. The Lambertian source 904 may reflect light within the exposed fiber core 802.

Part of the reflected light may be within a range of a propagation angle of the exposed fiber core 802. An amount of light that may propagate in the exposed fiber core 802 may be a relative part of the propagation angle from a solid angle of the reflected light. The solid angle may be calculated according to the following solid angle formula:

$$\int_0^{2\pi} \int_0^{\frac{\pi}{2}} I(\theta)\sin(\theta)d\theta d\varphi.$$

The relative part of the reflected light that is within the propagation angle may be calculated according to a sin(NA)= propagation angle α. If the NA of the exposed fiber core 802 is 0.22, the propagation angle α may be calculated as a sin(0.22)=12.7°=α.

Combining the Lambertian light distribution formula with the solid angle formula for the relative part of the reflected light that is within the propagation angle α may yield the following mode conversion formula:

$$\frac{1}{\pi}\int_0^{2\pi}\int_\alpha^{\frac{\pi}{2}}\cos(\theta)\sin(\theta)d\theta d\varphi = 0.15.$$

According to the mode conversion formula, 15% of the light reflected by a given point of the mode-conversion reflector 808 of FIG. 8 may be confined in the exposed fiber core 802. More particularly, 15% of higher order modes reflected by a given point of the mode-conversion reflector 808 may be converted to lower order modes. When the mode-conversion reflector 808 completely surrounds at least a portion of the exposed fiber core 802, most of the remaining 85% of the higher order modes may be reflected to another side of the mode-conversion reflector 808 which may convert another 15% of the higher order modes or reflected higher order modes incident thereon to lower order modes. When the location of the mode-conversion reflector 808 is selected to interact substantially or exclusively with higher order modes, more than 15% of the higher order modes may be converted to lower order modes.

Figure 10:
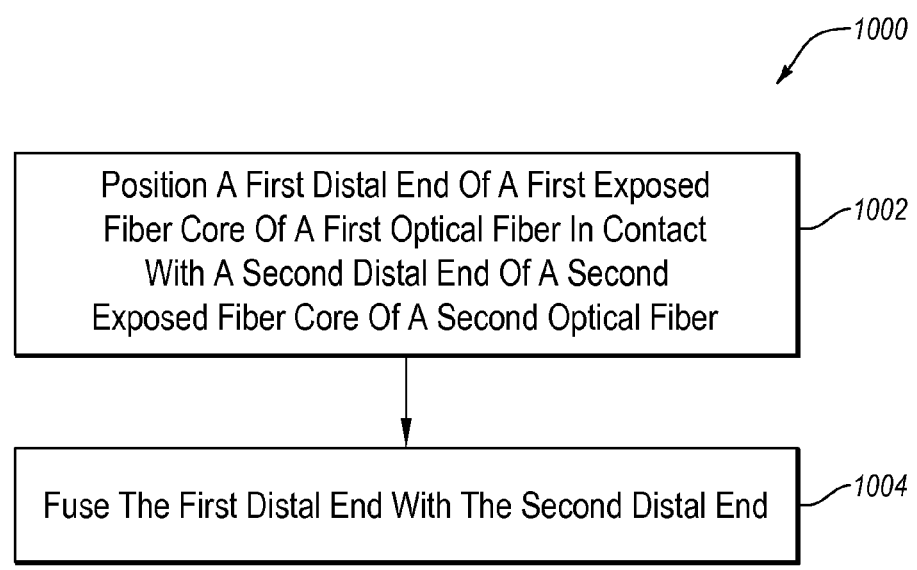
FIG. 10 shows a flow diagram of an example method of mechanically coupling two optical fibers.

Some embodiments described herein may alternately or additionally include mechanically coupling two optical fibers having exposed fiber cores together. In this regard, FIG. 10 shows a flow diagram of an example method 1000 of mechanically coupling two optical fibers, arranged in accordance with at least some embodiments described herein. The method 1000 includes various operations, functions, or actions as illustrated by one or more of blocks 1002 and/or 1004. The method 1000 may begin at block 1002.

In block 1002 ("Position A First Distal End Of A First Exposed Fiber Core Of A First Optical Fiber In Contact With A Second Distal End Of A Second Exposed Fiber Core Of A Second Optical Fiber"), a first distal end of a first exposed fiber core may be positioned in contact with a second distal end of a second exposed fiber core of a second optical fiber. Block 1002 may be followed by block 1004.

In block 1004 ("Fuse The First Distal End With The Second Distal End"), the first distal end may be fused with the second distal end. The first and second distal ends may be fused by melting the first and second distal ends together in some embodiments.

In some embodiments, the method 1000 of FIG. 10 may additionally include, prior to the fusing, aligning an optical axis of the first distal end with an optical axis of the second distal end such that the optical axis of the first distal end and the optical axis of the second distal end are substantially coaxial.

Alternately or additionally, fusing the first distal end with the second distal end may form a fused region. The method 1000 may further include forming a mode-conversion reflector that surrounds at least a portion of the fused region. The mode-conversion reflector may include the mode-conversion reflector 808 of FIG. 8, for example.

The method 1000 may be combined with either or both of the methods 600, 610 of FIGS. 6A and 6B and/or variations thereof. For example, the method 1000 may further include forming each of the first and second optical fibers with the first and second exposed fiber cores ab initio, embodiments of which are described with respect to FIGS. 6A and 6B. The forming each of the first and second optical fibers with the first and second exposed fiber cores ab initio may include, for the first optical fiber: forming the first exposed fiber core; forming a first unexposed fiber core after forming the first exposed fiber core, where the first unexposed fiber core is formed continuous with the first exposed fiber core; and forming a first cladding layer surrounding the first unexposed fiber core, where the first cladding layer and the first unexposed fiber core form a clad portion from which the first exposed fiber core extends. Alternately or additionally, the method 1000 may further include determining a target length of the first exposed fiber core prior to forming the first exposed fiber core, where forming the first exposed fiber core includes forming the first exposed fiber core having a length substantially equal to the target length.

Figure 11:
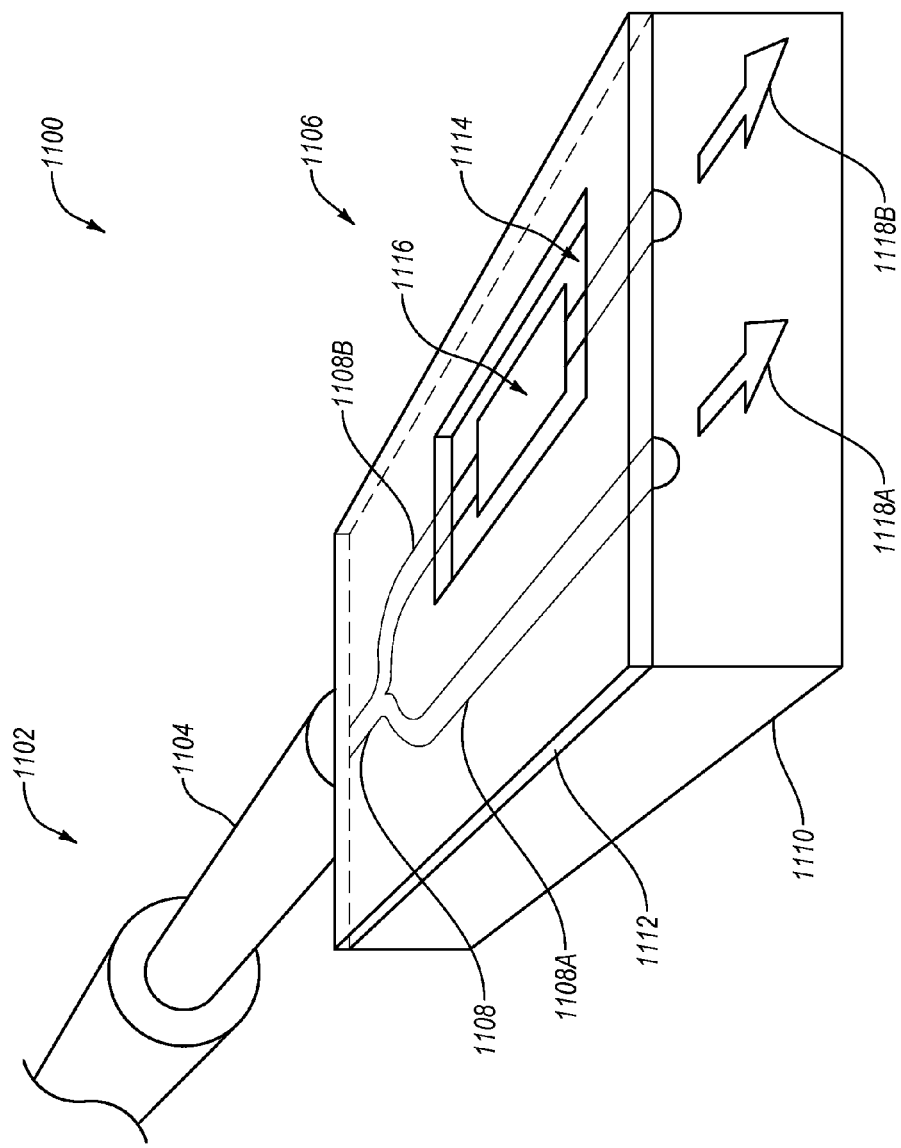
FIG. 11 illustrates an example operating environment in which an optical fiber with an exposed fiber core may be implemented, all arranged in accordance with at least some embodiments described herein.

FIG. 11 illustrates an example operating environment 1100 in which an optical fiber 1102 with an exposed fiber core 1104 may be implemented, arranged in accordance with at least some embodiments described herein. The optical fiber 1102 with the exposed fiber core 1104 may be formed according to methods described herein, such as the methods 600 and 610 of FIGS. 6A and 6B.

The exposed fiber core 1104 may be coupled to a waveguide structure 1106 including a waveguide channel 1108. The waveguide channel 1108 may have a relatively small diameter, such as a diameter on the order of a diameter of the exposed fiber core 1104. The absence of a cladding layer around the exposed fiber core 1104 may make it relatively easier to ensure optical alignment between the exposed fiber core 1104 and the waveguide channel 1108.

The waveguide channel 1108 may include branches 1108A and 1108B and may be formed in a substrate 1110. An isolation layer 1112 may be formed on the substrate 1110 over the waveguide channel 1108. The isolation layer 1112 may include transparent polytetrafluoroethylene (PTFE) or other suitable material. A window 1114 may be formed in the isolation layer 1112. A gold film 1116 may be formed on the substrate 1110 over a portion of the branch 1108B of the waveguide channel 1108.

The optical fiber 1102 and waveguide structure 1106 may collectively form a biosensor. In operation, a biological sample may be communicatively coupled to the gold film 1116 and light supplied through the optical fiber 1102 may be coupled into the waveguide channel 1108, where it is split between the branches 1108A and 1108B.

A first portion of the light may be output from the branch 1108A as a reference signal 1118A. A second portion of the light may be output from the branch 1108B as a sample signal 1118B. The reference signal 1118A and the sample signal 1118B may be collectively referred to as out-coupled light 1118. The out-coupled light 1118 from ends of the branches 1108A and 1108B may be emitted onto a screen or imaging detector, such as a charge-coupled device (CCD), where the out-coupled light 1118 may create an interference pattern from the reference signal 1118A and the sample signal 1118B interfering with each other.

The reference signal 1118A in the branch 1108A of the waveguide channel 1108 may be unaffected by the biological sample in contact with the gold film 1116. In contrast, properties or characteristics of the biological sample may ultimately alter transmissivity or other properties or characteristics of the branch 1108B such that the sample signal 1118B may have a different light propagation (e.g., phase change) than the reference signal 1118A. For example, the branch 1108B may experience a change of a refractive index (RI)—or Δn—in a region probed by an evanescent field that has been caused by the gold film 1116. The difference can be determined from the interference pattern created on the screen or imaging detector.

The present disclosure is not to be limited in terms of the particular embodiments described herein, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that the present disclosure is not limited to particular methods, reagents, compounds, compositions, or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub ranges and combinations of sub ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into sub ranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A fiber bundle comprising:
   a first optical fiber that has a first clad portion and a first exposed fiber core that extends from the first clad portion, wherein the first exposed fiber core is devoid of cladding;
   one or more second optical fibers wherein each of the one or more second optical fibers has a second clad portion and a second exposed fiber core that extends from the second clad portion, wherein each second clad portion is arranged substantially parallel to the first clad portion, and wherein each second exposed fiber core is devoid of cladding;
   a condensed region in which a first distal end of the first exposed fiber core is arranged substantially parallel to a second distal end of each second exposed fiber core, wherein adjacent distal ends in the condensed region have a first center-to-center spacing, wherein each of the first optical fiber and the one or more second optical fibers is configured to be optically aligned with a transducer of an array of transducers, and wherein two adjacent transducers of the array of transducers are spaced at a nominal pitch substantially equal to the first center-to-center spacing; and
   a non-condensed region that includes the first clad portion and the one or more second clad portions, wherein adjacent clad portions in the non-condensed region have a second center-to-center spacing that is greater than the first center-to-center spacing.

2. The fiber bundle of claim 1, wherein the first center-to-center spacing is less than a diameter of the first clad portion of the first optical fiber.

3. The fiber bundle of claim 1, wherein the first center-to-center spacing is approximately equal to a core diameter of the first exposed fiber core of the first optical fiber.

4. The fiber bundle of claim 1, wherein the first center-to-center spacing is between 10 micrometers and 100 micrometers, and the second center-to-center spacing is between 150 micrometers and 500 micrometers.

5. The fiber bundle of claim 4, wherein the first center-to-center spacing is about 50 micrometers and the second center-to-center spacing is about 250 micrometers.

6. The fiber bundle of claim 1, wherein a length of each second exposed fiber core depends on a lateral displacement between a center of each corresponding second clad portion and a center of each corresponding second distal end.

7. The fiber bundle of claim 6, wherein the length of each second exposed fiber core is greater than or equal to $4 \cdot R \cdot a \sin [0.5(D/R)^{1/2}]$, where R is a minimum bend radius of the corresponding second optical fiber, a sin is an inverse sine function, and D is the lateral displacement between the center of each corresponding second clad portion and the center of each corresponding second distal end.

8. The fiber bundle of claim 1, further comprising a ferrule that secures the adjacent distal ends in the condensed region at the first center-to-center spacing.

9. The fiber bundle of claim 1, wherein:
the first optical fiber further includes a first mode stripper layer that surrounds at least a portion of the first exposed fiber core; and
each of the one or more second optical fibers further includes a second mode stripper layer that surrounds at least a portion of the corresponding second exposed fiber core.

10. The fiber bundle of claim 1, wherein:
the first optical fiber further includes a first mode-conversion reflector that surrounds at least a portion of the first exposed fiber core; and
each of the one or more second optical fibers further includes a second mode-conversion reflector that surrounds at least a portion of the corresponding second exposed fiber core.

11. The fiber bundle of claim 10, wherein each of the first mode-conversion reflector and the second mode-conversion reflector comprises a diffuse reflector.

12. The fiber bundle of claim 1, wherein the array of transducers includes an array of source emitters that are arranged to emit optical signals into the first distal end of the first exposed fiber core and into the second distal end of each second exposed fiber core.

13. The fiber bundle of claim 12, wherein:
a sum of a diameter of each source emitter in the array of source emitters and a lateral position tolerance of each source emitter is less than a diameter of each of the first exposed fiber core and each second exposed fiber core;
a refractive index of each of the first exposed fiber core and each second exposed fiber core is greater than or equal to 1.34; and
a distance between a light emission surface of each source emitter and a light entrance surface of each corresponding distal end is less than or equal to a threshold distance at which 90% of light emitted by each source emitter is incident on each corresponding light entrance surface of each corresponding distal end.

14. A method of forming an optical fiber, the method comprising:
forming an exposed fiber core and an unexposed fiber core by feeding a core material into a first crucible chamber of a double crucible;
wherein the unexposed fiber core is formed after forming the exposed fiber core, and wherein the unexposed fiber core is formed continuous with the exposed fiber core;
forming a cladding layer by feeding a cladding layer material into a second crucible chamber of the double crucible, wherein the cladding layer surrounds the unexposed fiber core,
wherein the cladding layer and the unexposed fiber core form a clad portion from which the exposed fiber core extends; and
separately controlling the feeding of the core material into the first crucible chamber and the feeding of the cladding layer material into the second crucible chamber to form the exposed fiber core prior to formation of the cladding layer.

15. A fiber bundle comprising:
a first optical fiber that includes a first clad portion and a first exposed fiber core that extends from the first clad portion, wherein the first exposed fiber core has a first distal end; and
second optical fibers arranged around the first optical fiber,
wherein:
each second optical fiber includes a second clad portion and a second exposed fiber core that extends from the second clad portion, and each of the second exposed fiber cores has a corresponding second exposed fiber core length; and
each second exposed fiber core includes a bend region in which the corresponding second exposed fiber core is displaced by a corresponding displacement distance towards the first exposed fiber core, wherein each of the first optical fiber and the one or more second optical fibers is configured to be optically aligned with a transducer of an array of transducers, and wherein two adjacent transducers of the array of transducers are spaced at a nominal pitch substantially equal to a center-to-center spacing, the center-to-center spacing being substantially equal to a spacing between adjacent distal ends within the a region that includes the first distal end of the first optical fiber and a second distal end of each second optical fiber.

16. The fiber bundle of claim 15, wherein:
each second clad portion is substantially parallel to the first clad portion;
and
the first distal end of the first exposed fiber core is substantially parallel to the second distal end of each second exposed fiber core.

17. The fiber bundle of claim 16, further comprising a ferrule that secures adjacent ones of the first distal end of the first exposed fiber core and second distal ends of the second exposed fiber core at a center-to-center spacing less than a clad diameter of the first clad portion of the first optical fiber.

18. The fiber bundle of claim 15, wherein each second exposed fiber core length is greater than or equal to $4 \cdot R \cdot a \sin [0.5(D/R)^{1/2}]$, where R is a minimum bend radius of the second optical fiber, a sin is an inverse sine function, and D is the displacement distance.

19. An optical assembly, including:
a plurality of transducers, that has a transducer spacing between a first transducer and a second transducer of the plurality of transducers; and
a fiber bundle which includes a first optical fiber that has a first clad portion and a first exposed fiber core that extends from the first clad portion, and a second optical fiber that has a second clad portion and a second exposed fiber core that extends from the second clad portion, wherein the second clad portion is substantially parallel to the first clad portion,
wherein the fiber bundle includes:
   a condensed region in which a first distal end of the first exposed fiber core is arranged substantially parallel to a second distal end of the second exposed fiber core, wherein the first distal end and the second distal end has a first center-to-center spacing, wherein each of the first optical fiber and the one or more second optical fibers is configured to be optically aligned with a transducer of the plurality of transducers; and
   a non-condensed region that includes the first clad portion and the second clad portion, wherein the first clad portion and the second clad portion in the non-condensed region have a second center-to-center spacing,
wherein the second center-to-center spacing is greater than the first center-to-center spacing, and the first center-to-center spacing is approximately equal to the transducer spacing.

20. The optical assembly of claim 19, wherein each of the plurality of transducers is optically coupled to a selected optical fiber of the fiber bundle, wherein the first distal end is optically coupled to the first transducer, and the second distal end is optically coupled to the second transducer.

21. The optical assembly of claim 19, wherein the plurality of transducers includes a plurality of source emitters.

22. The optical assembly of claim 19, wherein the plurality of transducers includes a laser.

23. The optical assembly of claim 19, wherein the plurality of transducers includes an optical detector.

* * * * *

UNITED STATES PATENT AND TRADEMARK OFFICE
CERTIFICATE OF CORRECTION

PATENT NO. : 9,946,040 B2
APPLICATION NO. : 15/112165
DATED : April 17, 2018
INVENTOR(S) : Meir et al.

Page 1 of 1

It is certified that error appears in the above-identified patent and that said Letters Patent is hereby corrected as shown below:

In the Claims

In Column 21, Lines 21 and 22, in Claim 7, please delete "$4 \cdot R \cdot a \sin [0.5(D/R)^{1/2}]$" and insert -- $4 \cdot R \cdot asin[0.5(D/R)^{1/2}]$ -- therefor.

In Column 21, Line 23, in Claim 7, please delete "a sin" and insert -- asin -- therefor.

In Column 22, Line 64, in Claim 18, please delete "$4 \cdot R \cdot a \sin$" and insert -- $4 \cdot R \cdot asin$ -- therefor.

In Column 22, Line 66, in Claim 18, please delete "a sin" and insert -- asin -- therefor.

Signed and Sealed this
Thirty-first Day of March, 2020

Andrei Iancu
*Director of the United States Patent and Trademark Office*